US011314246B2

(12) United States Patent
Ghorbanian-Matloob et al.

(10) Patent No.: US 11,314,246 B2
(45) Date of Patent: Apr. 26, 2022

(54) COMMAND TOOLBOX FOR AUTONOMOUS VEHICLES

(71) Applicant: Uber Technologies, Inc., San Francisco, CA (US)

(72) Inventors: Samann Ghorbanian-Matloob, San Francisco, CA (US); Sean Shanshi Chen, San Francisco, CA (US); Patrick Greaney Willett, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 186 days.

(21) Appl. No.: 16/711,799

(22) Filed: Dec. 12, 2019

(65) Prior Publication Data
US 2021/0048814 A1    Feb. 18, 2021

Related U.S. Application Data

(60) Provisional application No. 62/887,777, filed on Aug. 16, 2019.

(51) Int. Cl.
*G05D 1/00* (2006.01)
(52) U.S. Cl.
CPC ......... *G05D 1/0027* (2013.01); *G05D 1/0016* (2013.01)
(58) Field of Classification Search
CPC ............... G05D 1/0027; G05D 1/0016; G05D 2201/0213
(Continued)

(56) References Cited

U.S. PATENT DOCUMENTS 4,405,943 A    9/1983   Kanalv
6,405,132 B1   6/2002   Breed
(Continued)

FOREIGN PATENT DOCUMENTS

WO    WO 2017/079219    5/2017

OTHER PUBLICATIONS

William Ross, U.S. Appl. No. 14/711,570, filed May 13, 2015, Providing Remote Assistance to an Autonomous Vehicle.
(Continued)

*Primary Examiner* — Muhammad Shafi
(74) *Attorney, Agent, or Firm* — Schwegman Lundberg & Woessner, P.A.

(57) ABSTRACT

The present disclosure is directed to a system for generating customized command toolboxes for remote operators in a service system that includes autonomous vehicles. The system receives a request for remote assistance from an autonomous vehicle. The system determines, from a local storage location, vehicle data associated with the autonomous vehicle. The system selects a subset of remote assistance actions from a predetermined set of remote assistance actions. The system displays, in a remote assistance user interface, one or more user interface elements indicative of the subset of remote assistance actions. The system determines one or more remote assistance actions from the subset of remote assistance actions based at least in part on a user input associated with the one or more user interface elements. The system transmits one or more control signals associated with the one or more remote assistance actions.

19 Claims, 11 Drawing Sheets

(58) Field of Classification Search
USPC .......................................................... 701/2
See application file for complete search history.

(56) References Cited

U.S. PATENT DOCUMENTS

| | | | |
|---|---|---|---|
| 7,359,004 | B2 | 4/2008 | Yu |
| 8,370,392 | B1 | 2/2013 | Hunt |
| 8,601,595 | B2 | 12/2013 | Gelvin |
| 9,384,402 | B1 | 7/2016 | Furman |
| 9,507,346 | B1 | 11/2016 | Levinson et al. |
| 2007/0185646 | A1 | 8/2007 | Neuqebauer |
| 2011/0208417 | A1 | 8/2011 | Fink |
| 2015/0024131 | A1 | 1/2015 | Evans |
| 2015/0178953 | A1 | 6/2015 | Gao |
| 2015/0244826 | A1 | 8/2015 | Stenneth |
| 2015/0248131 | A1 | 9/2015 | Fairfield |
| 2016/0139594 | A1 | 5/2016 | Okumura |
| 2016/0334230 | A1 | 11/2016 | Ross et al. |
| 2016/0358475 | A1 | 12/2016 | Prokhorov |
| 2017/0192423 | A1 | 7/2017 | Rust |
| 2017/0223712 | A1 | 8/2017 | Stephens |
| 2018/0181118 | A1 | 6/2018 | Yoneda |
| 2018/0257661 | A1 | 9/2018 | Kroop |
| 2018/0267537 | A1 | 9/2018 | Kroop et al. |
| 2018/0281815 | A1 | 10/2018 | Stentz |
| 2018/0365908 | A1* | 12/2018 | Liu ...................... G05D 1/0044 |
| 2019/0056733 | A1* | 2/2019 | Ferguson ............. G05D 1/0276 |
| 2019/0126775 | A1* | 5/2019 | Han ........................ B60L 58/13 |
| 2019/0163176 | A1* | 5/2019 | Wang ................... G05D 1/0038 |
| 2019/0196464 | A1* | 6/2019 | Lockwood ........... G05D 1/0016 |

OTHER PUBLICATIONS

Benjamin Kroop, U.S. Appl. No. 15/427,967, filed Feb. 8, 2017, An Autonomous Vehicle Autonomous Vehicle Control System Implementing Teleassistance.

Benjamin Kroop, U.S. Appl. No. 15/452,431, filed Mar. 7, 2017, Teleassistance Data Prioritization for Self-Driving Vehicles.

Anthony Stentz, U.S. Appl. No. 15/959,100, filed Apr. 20, 2018, Predictive Teleassistance System for Autonomous Vehicles.

Fong, Terrence et al., "Vehicle teleoperation interfaces", Autonomous Robots 11, pp. 9-18, 2001.

Reuschenbach, Arturo et al., "iDriver—human machine interface for autonomous cars", 2011 Eighth International Coference on Information Technology: New Generations, Las Vegas, NV 2011, pp. 435-440.

International Search Report and Written Opinion for Application No. PCT/US2020/046640, dated Oct. 2, 2020, 13 pages.

* cited by examiner

COMMAND TOOLBOX FOR AUTONOMOUS VEHICLES

RELATED APPLICATION

The present application is based on and claims benefit of U.S. Provisional Patent Application No. 62/887,777 having a filing date of Aug. 16, 2019, which is incorporated by reference herein.

FIELD

The present disclosure relates generally to improvements in the operation of autonomous vehicles, and more particularly, to improvements in computing systems associated with providing remote autonomous vehicle assistance to autonomous vehicles.

BACKGROUND

As autonomous vehicle driving technology improves, autonomous vehicles have become increasingly useful in a number of technology fields. One potential use of autonomous vehicles is to provide on-demand transportation services to passengers and organizations that have the need for transportation services. Such services can include a passenger transportation service, a courier service, and a delivery service. Managing such an on-demand transportation service can include providing a variety of services to passengers and autonomous vehicles. For example, a service provider can provide remote assistance to a plurality of autonomous vehicles, especially in cases where the autonomous vehicles encounter problems that they cannot solve independently.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method can include receiving, by a computing system comprising one or more computing devices, a request for remote assistance from an autonomous vehicle. The method can also include determining, by the computing system from a local storage location and based at least in part on the request for remote assistance, vehicle data associated with the autonomous vehicle. The method can also include selecting, by the computing system and based at least in part on the vehicle data, a subset of remote assistance actions from a predetermined set of remote assistance actions. The method can also include displaying, by the computing system in a remote assistance user interface, one or more user interface elements indicative of the subset of remote assistance actions. The method can also include determining, by the computing system, one or more remote assistance actions from the subset of remote assistance actions based at least in part on a user input associated with the one or more user interface elements. The method can also include transmitting, by the computing system, to the autonomous vehicle, one or more control signals associated with the one or more remote assistance actions.

Other example aspects of the present disclosure are directed to systems, methods, vehicles, apparatuses, tangible, non-transitory computer-readable media, and memory devices for controlling autonomous vehicles and efficiently using the computational resources of the autonomous vehicles and remote computing systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
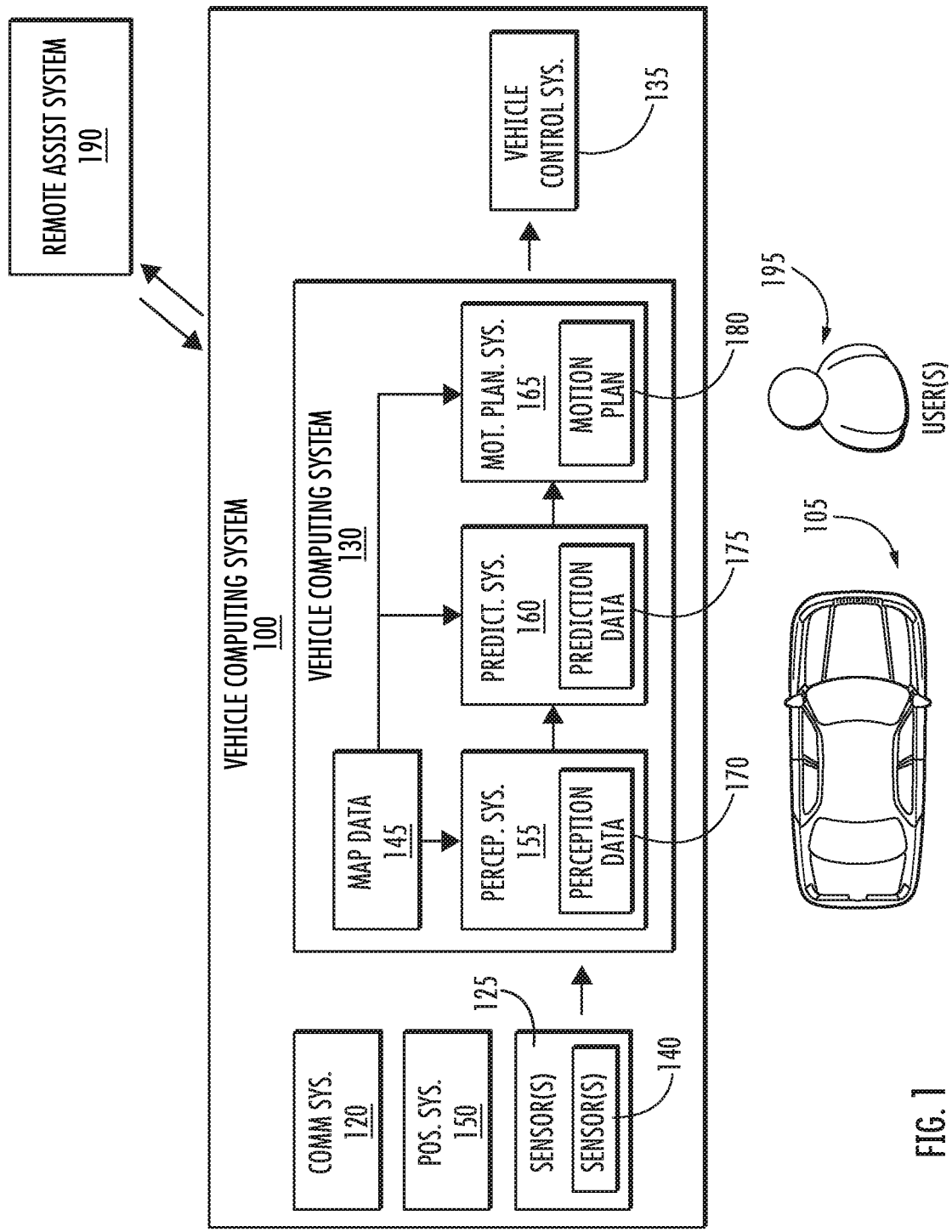
FIG. 1 depicts an example autonomous vehicle computing system according to example aspects of the present disclosure.

Generally, embodiments in accordance with the present disclosure are directed to computing systems and methods for providing remote assistance to autonomous vehicles. A remote assistance system in accordance with some examples can include a remote assistance user interface (UI) that is customized in response to a request for remote vehicle assistance. A customized remote assistance UI can be provided to a remote operator, such as through a display or other output device. The customized remote assistance UI can include user interface elements representative of a set of remote assistance tools that are related to the request, such as a set of tools corresponding to a particular vehicle. In some examples, the remote assistance UI can include one or more remote assistance toolboxes that are customized in response to particular requests from autonomous vehicles for remote assistance. For example, the remote assistance system may select one or more remote assistance actions from a plurality of potential remote assistance actions based on vehicle data from a request for remote assistance and associated with a particular autonomous vehicle. A remote assistance toolbox can be customized to include user interface elements that are associated with each selected remote assistance action. The user interface elements can be displayed within the one or more remote assistance toolboxes.

Example aspects of the present disclosure are directed to improvements in the operation of autonomous vehicles, and more particularly, to improvements in computing systems associated with providing remote autonomous vehicle assistance to autonomous vehicles. An autonomous vehicle may request remote autonomous vehicle assistance from a remote autonomous vehicle assistance system including one or more computing devices configured to assist the autonomous vehicle with one or more autonomous computing tasks. By way of example, an autonomy computing system may request remote autonomous assistance for autonomous computing tasks such as object classification, object prediction, mapping, motion planning, vehicle status checks, etc. Such tasks may typically be performed onboard the autonomous vehicle by the vehicle computing system. In some instances, however, an autonomous vehicle may request that a remote autonomous vehicle assistance system provide autonomous vehicle assistance with one or more vehicle computing tasks. For example, the remote assistance system may perform one or more assisted autonomy tasks to assist with one or more autonomous computing tasks at the autonomous vehicle. The remote vehicle assistance system may include a remote assistance user interface (UI) that provides one or more remote assistance toolboxes. The remote assistance UI allows the remote vehicle assistance system to engage one or more operators (e.g., human or computer) to at least partially facilitate responses to requests for remote assistance. For example, sensor data from the autonomous vehicle may be transmitted to the autonomous vehicle assistance system and viewed by an operator. The operator can provide input to the autonomous vehicle assistance system which can generate control messages for the autonomous computing system to assist with the autonomous computing task.

According to example aspects of the present disclosure, a remote assistance system includes a remote assistance user interface (UI) that is customized based on parameters associated with vehicle data accessed or received in response to requests from autonomous vehicles for remote assistance. For example, a centrally-controlled on-demand transportation service may interface with a variety of different autonomous vehicles that have different capabilities and are associated with different vendors. As a result, the remote assistance system may have different levels of access to or control over different types of autonomous vehicles. When a request is received, vehicle data associated with a particular autonomous vehicle can be accessed from a local storage device at a computer system or received from the request itself. The remote assistance UI can be customized based on the vehicle data associated with a particular request.

The remote assistance user interface for a particular remote assistance session (e.g., in which an operator attempts to resolve a particular request for remote assistance) can include one or more customized remote assistance toolboxes that are populated with user interface elements representing remote assistance actions. The particular remote assistance actions can be selected based on vehicle data associated with a particular request for remote assistance. The vehicle data can be included with the request for remote assistance and/or can be derived from the request, such as by accessing the vehicle data from local storage based on an identification of the vehicle in or determined from the request. The vehicle data can include, among other things, request parameter data such as may indicate a request type associated with the request for remote assistance, vehicle model data associated with a particular autonomous vehicle, and/or situational data associated with the request for remote assistance. In some example embodiments, the vehicle data can include, among other things, the capabilities of the autonomous vehicle, the ownership and autonomous software characteristics of the autonomous vehicle, sensor data from the autonomous vehicle, and so on. The situational data may include, for example, data indicative of the type of assistance requested and/or data indicative of an event or situation that resulted in the request for remote assistance. The request parameter data may include user data such as may indicate the preferences of a passenger. As one example, a request for remote assistance may be received at a computer system associated with providing remote assistance to autonomous vehicles. The request for remote assistance may include or provide data that allows access to vehicle data for the associated autonomous vehicle describing its current situation, including data from one or more sensors at the autonomous vehicle. This information may be displayed to an operator in a remote assistance interface.

By way of example, a request for remote assistance can be generated by an autonomous vehicle in response to detecting an object that the autonomous vehicle is unable to classify. The autonomous vehicle can send a request for remote assistance to a remote assistance system. The request for remote assistance can be used to determine one or more request parameters. The one or more request parameters can be determined from a local storage location and/or can be included in the request. For example, the request may include one or more request parameters that are associated with the request for remote assistance, including, but not limited to, the autonomous vehicle's location, an identifier for the autonomous vehicle, passenger information, a request type identifier (in this case the request is a request for assistance to classify an object), and sensor data from one or more of the sensors included in the autonomous vehicle. One or more request parameters such as vehicle capability data, vehicle vendor data, vehicle operator data, and so on can be determined by accessing such data from a local storage location based on the request for remote assistance.

The remote assistance system can assign a remote operator to the request for remote assistance and display relevant data received from the autonomous vehicle in a remote assistance user interface provided by a computing device that is accessed by the assigned remote operator. The displayed data (e.g., including sensor data from the autonomous vehicle) can provide context and other information that the remote assistance operator can use to select an appropriate remote assistance action. A remote assistance toolbox can be displayed in the remote assistance interface (e.g., in a context appropriate location). The remote assistance toolbox can include user interface elements associated with particular remote assistance actions. The specific remote assistance actions that are represented in the remote assistance toolbox can be customized based on the vehicle data accessed in response to the request for remote assistance. Customizing the specific remote assistance actions can include using the vehicle data to determine a requested assistance type, a vendor associated with the autonomous vehicle, and other relevant information. For example, a first vendor can be associated with a first set of remote assistance actions and a second vendor can be associated with a second set of remote assistance actions. Thus, once a vendor is identified for a particular request for remote assistance, the remote assistance system can identify which set of remote assistance actions to select for the remote assistance toolbox. Similarly, an assistance type can be included in or determined from vehicle data associated with a request for remote assistance. Each assistance type can be associated with one or more sets of remote assistance actions. For example, if the assistance type is object classification, an associated remote assistance action can be associated with classifying objects.

In other examples, the remote assistance system can select remote assistance actions that are represented in the remote assistance toolbox by accessing data associated with previous requests for remote assistance. A previous request for remote assistance can be associated with vehicle data from past requests. The remote assistance system can identify an association between a previous request for remote assistance and the current request for remote assistance based on a correspondence between vehicle data associated with the previous request and the vehicle data associated with the current request. The remote assistance system can select remote assistance actions based on the remote assistance actions associated with the one or more previous requests for remote assistance that are associated with the current request for remote assistance. For example, the system may first identify a previous request for remote assistance that has a correspondence to the current request for remote assistance. The system can identify the remote assistance action that was implemented in response to the previous request for remote assistance. The system can provide a user interface element indicative of the remote assistance action that was implemented in response to the previous request for remote assistance.

In accordance with some examples, the remote assistance system can determine a predicted success score for each remote assistance action that is determined to be available. The remote assistance actions can be ordered based on their associated predicted success scores. In some example embodiments, one or more remote assistance actions can be selected based on their associated predicted success scores. The number of remote assistance actions selected can be based on the size and location of the remote assistance toolbox, one or more situational criteria, or any other criteria. Each selected remote assistance action can be associated with a displayed user interface element in the remote assistance toolbox. The operator can provide input indicating selection of one or more remote assistance actions and the remote assistance system can generate control messages for the autonomous computing system to assist with the autonomous computing task.

More particularly, a service entity (e.g., service provider, owner, manager, platform) can use one or more vehicles (e.g., ground-based vehicles) to provide a vehicle service such as a transportation service (e.g., rideshare service), a courier service, a delivery service, etc. For example, the service entity (e.g., its operations computing system) can receive requests for vehicle services (e.g., from a user) and generate service assignments (e.g., indicative of the vehicle service type, origin location, destination location, and/or other parameters) for the vehicle(s) to perform. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from the sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the service entity, such as the service entity's operations computing system, and/or a remote assistance computing. The service entity's operations computing system can include a plurality of system clients that can help the service entity monitor, communicate with, manage, etc. autonomous vehicles. In this way, the service entity can manage the autonomous vehicles to provide the vehicle services of the entity.

A user can provide (e.g., via a user computing device) a request for a vehicle service to an operations computing system associated with the service entity. The request can indicate the type of vehicle service that the user desires (e.g., a user transportation service, a delivery service, a courier service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information.

The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system so that the vehicle computing system can communicate with the operations computing system via a network of the service entity. Once online, the operations computing system can communicate a vehicle service assignment indicative of the requested vehicle services and/or other data to the autonomous vehicle.

The service entity can engage with a variety of autonomous vehicles types to provide the vehicle services. For example, some autonomous vehicles can be owned and operated by the service entity (e.g., a "first-party autonomous vehicle"), other autonomous vehicles associated with the service entity can be associated with a third-party entity such as, for example, an individual, an original equipment manufacturer (OEM), or another entity (e.g., a "third-party autonomous vehicle"). Another category of autonomous vehicles is possible wherein the autonomous vehicles include some combinations of the features of the first-party autonomous vehicles and the third-party autonomous vehicles. Such autonomous vehicles can be owned by an entity other than the service entity but might include software or hardware that is distributed by the service entity and thereby have the ability to more closely integrate with the service entity.

Even though the third-party autonomous vehicle may not be included in the fleet of autonomous vehicles of the service entity, the platforms of the present disclosure can allow such third-party autonomous vehicles to still be utilized to provide the vehicle services offered by the service entity, access its system clients, etc.

In some example embodiments, one such service offered by the service system can be a remote assistance service. A remote assistance service can be implemented by a remote assistance system which receives one or more requests for remote assistance from an autonomous vehicle (e.g., automatically generated in response to one or more detected problems) or a passenger in an autonomous vehicle (e.g., via an electronic device associated with the passenger such as a smartphone or tablet computer). By way of example, an autonomous vehicle may encounter an unexpected blockage in the way of a planned route (e.g., a fallen tree or another obstacle). The autonomous vehicle may not have a high enough confidence level to autonomously generate a new path or navigate around the obstruction. Thus, the autonomous vehicle can send (e.g., via its onboard communication system) a communication including a request for remote assistance to the remote assistance system.

Upon receiving a request for remote assistance from an autonomous vehicle, the remote assistance system can assign an operator to assist the requesting autonomous vehicle. In some example embodiments, the request for remote assistance may also be associated with particular request parameters. For example, the associated request parameters can include information identifying the specific vehicle, information about the capabilities of the vehicle, the vendor that owns the vehicle, information describing autonomous driving software that is currently operating the autonomous vehicle, and the specific remote assistance actions that are available to the remote assistance system. In other examples, the request parameters include an identifier of the specific autonomous vehicle and the remote assistance system accesses more specific data from a database of vehicle data using the identifier as a key. Thus, a remote assistance system can use one or more request parameters to access vehicle data relevant to the request for remote assistance.

In some example embodiments, the vehicle data can include situational data for the autonomous vehicle. Situational data includes data describing the current situation of the vehicle including location, heading, velocity, the number and identities of passengers, and the data from any sensors included in the autonomous vehicle including but not limited to cameras, a LIDAR sensor, and radar sensors.

In some example embodiments, the remote assistance system is associated with a plurality of computer systems. One of the computer systems can be associated with the assigned operator for a particular remote assistance session. The remote assistance system can display, in a remote assistance user interface at the computer system of an operator, some or all of the vehicle and situational data accessed based on the request parameters. For example, the user interface can include camera views from the autonomous vehicle and a computer representation of LIDAR/radar data.

In some example embodiments, the remote assistance user interface includes data that highlights or otherwise designates one or more issues associated with the request for remote assistance. For example, if an autonomous vehicle has trouble classifying a particular object, that object can be visually highlighted in the remote assistance user interface. This visual highlighting can include both processing video data received from a camera in an autonomous vehicle to visually distinguish the object and/or distinguishing the object in a computer-generated representation of the LIDAR/radar data.

The remote assistance user interface can also include one or more remote assistance toolboxes in the remote assistance user interface. For example, the remote assistance user interface can generate a remote assistance toolbox to include user interface elements that represent or are associated with one or more potential remote assistance actions. In this way, a remote assistance operator can view one or more suggested remote assistance actions in the remote assistance toolbox and select one or more of the remote assistance actions to perform in an attempt to resolve one or more issues associated with the received request for remote assistance.

In some example embodiments, the remote assistance system selects one or more remote assistance actions from a set of all possible remote assistance actions based on one or more criteria. The one or more criteria can be based on data associated with the vehicle (e.g., vehicle data), data associated with the situation (e.g., situational data including but not limited to sensor data), and data associated with the passenger (e.g., passenger's preferences). Using this data, the remote assistance system can rank the set of all possible remote assistance actions such that one or more of the remote assistance actions can be selected to be associated with a user interface element presented in the remote assistance toolbox.

In some examples, each potential remote assistance action is evaluated to determine whether it is possible to be performed in the current remote assistance session. Some remote assistance actions may be determined to not be possible based on vehicle data (including situational data) accessed during the current remote assistance session. For example, if the autonomous vehicle is moving forward, the remote assistance system can determine that driving backward (going in reverse) is not possible. Instead, a stop action can be selected first. After the autonomous vehicle has stopped, the remote operator can select a remote assistance action that causes the autonomous vehicle to drive in reverse. In another example, if the autonomous vehicle is on a single lane road, the remote assistance system can determine that the "lane change" remote assistance action is not available. In some example embodiments, the autonomous vehicle's sensors may detect an object that renders a particular remote assistance action unavailable. For example, the remote operator cannot select a change lane action if doing so would cause a collision with another vehicle.

The remote assistance system can also determine whether a given remote assistance action is available based on other vehicle data. As noted above, vehicles with a plurality of different vendors may request remote assistance including "first-party vehicles" and "third-party vehicles," as well as vehicles that includes features of both first-party and third-party vehicles. In some examples, each vendor can determine which particular remote assistance actions are available for autonomous vehicles it owns. In some examples, a first set of remote assistance actions are available to first-party autonomous vehicles and a second set of remote assistance actions are available for third-party autonomous vehicles. The first set of remote assistance actions may allow more direct control of the autonomous vehicles (e.g., the service entity owns and operates the autonomous vehicles and thus allows more direct control) and the second set of remote assistance actions may allow remote assistance actions that do not require direct control of the autonomous vehicles (e.g., the outside vendors may provide an interface that allows certain actions to be requested without allowing any direct control). Thus, the first and second set of remote assistance actions can be associated with different levels of autonomous control.

For example, first-party vehicles, which are owned and operated by the service system, may receive any remote assistance action in some instances. For example, the first-party vehicles can be configured to allow a remote operator to take direct control of the autonomous vehicle and directly control its components (e.g., steering, acceleration, braking). In other examples, the remote operator may be able to directly control one or more autonomous systems of a first-party vehicle. For example, the remote operator may be able to generate paths that are provided to the motion planner or classifications that are provided to the perception system. In some examples, third-party vehicles can be configured such that a remote operator from the remote assistance service is not permitted to have direct control of the autonomous vehicle and instead is offered a set of remote commands that can be sent to the third-party vehicle for execution, including but not limited to: setting a new destination, connecting a passenger with local emergency services, or summoning roadside assistance as needed.

In addition, determinations about which remote assistance actions are available can be based on the specific vehicle type of the autonomous vehicle that sent the request for remote assistance. For example, a particular autonomous vehicle may be equipped with four-wheel drive. As a result, the autonomous vehicle can receive remote assist actions that instruct the autonomous vehicle to take paths that would not be navigable for an autonomous vehicle without four-wheel drive. Similarly, a particular autonomous vehicle may not include the ability to drive in reverse. As such, remote assist actions that include driving in reverse may not be provided in response to a request for remote assistance that is associated with an autonomous vehicle that cannot drive in reverse.

Once the remote assistance system determines a group of remote assistance actions that are allowable in the current remote assistance session, the system can select one or more remote assistance actions to include in a remote assistance toolbox. In some example embodiments, the remote assistance system generates an estimated success score for each potential remote assistance action. For example, for each potential remote assistance action, the remote assistance system can estimate the likelihood of success of the remote assistance action and generate a score that represents the degree to which the remote assistance action is correct for the current situation.

In some example embodiments, the estimated success score is generated by accessing past remote assistance action data. The remote assistance system can access historical data to identify past requests for remote assistance that are similar to the current one based on the vehicle data or request parameters associated with each request for remote assistance.

Once the remote assistance system identifies past requests for remote assistance that are associated with the current request for remote assistance based on the request parameters, the remote assistance system can identify the remote assistance actions taken by the remote operators and whether those remote assistance actions were successful in resolving the request for remote assistance. The remote assistance system can generate a score for each potential remote assistance action based on how often the potential remote assistance action was selected in response to associated requests for remote assistance and the degree to which the remote assistance action was deemed successful.

In some example embodiments, the remote assistance system selects one or more remote assistance actions and generates a user interface element to represent those remote assistance actions. The user interface elements can be displayed in the one or more remote assistance toolboxes in the user interface provided to the operator assigned to the current request for remote assistance. In some examples, the number of remote assistance actions selected can be based on the amount of space available in the remote assistance toolbox in the user interface. Thus, having more available space in the user interface can result in a larger number of remote assistance actions selected to be displayed as user interface elements to a remote operator. In other examples, the remote assistance system can select all remote assistance actions with scores above a threshold estimated success score value and generate user interface elements for each selected remote assistance action.

In some example embodiments, once a remote assistance toolbox has been populated with suggested remote assistance actions and displayed in the remote assistance user interface, the operator can provide input indicating selection of one or more of the user interface elements associated with particular remote assistance actions. For example, if the remote assistance toolbox includes five user interface elements, each labeled to represent a possible remote assistance action, the operator can use a mouse to click on one of the user interface elements. The remote assistance system can send control signals to the autonomous vehicle that indicate the selected remote assistance action and provide any needed data or instructions to perform the selected remote assistance action. In another example, the control signals can be sent to a server system associated with a particular vendor (e.g., the vendor that operates the autonomous vehicle associated with the current request for remote assistance.)

In some example embodiments, the specific remote assistance actions presented can be associated with the request for remote assistance. For example, if the request for remote assistance includes an indication that the autonomous vehicle has been unable to classify a particular object, the remote assistance toolbox may select remote assistance actions associated with classifying an object, including an option to gather additional data about the object (e.g., by moving the autonomous vehicle) and/or make a classification based on existing data (e.g., a human operator choosing an object classification from a list based on camera data). In some examples, the presented remote assistance actions can include one or more common object classifications (e.g., a vehicle, a person, a building, and so on).

Potential remote assistance actions can include directly controlling an autonomous vehicle remotely. In this case, a remote operator can control the autonomous vehicle as a human operator would normally control a vehicle (e.g., controlling direction, acceleration, braking, available signals, and so on). As another example, the operator may view sensor data and provide path assistance such as an indication of a general path for the autonomous vehicle to travel within a geographical area. For example, the remote operator may provide an input to generate one or more points (e.g., positional coordinates) through which the autonomous vehicle should travel. The one or more points and/or other data may comprise task management data that is provided from an operator computing system to the remote assistance interface. The remote assistance interface can generate one or more control commands including data indicative of the target vehicle path provided by the operator. The autonomy computing system of the autonomous vehicle can receive the path information and generate an appropriate motion plan to follow the identified path.

Other potential remote assistance actions can include commands to perform specific driving remote assistance actions without taking direct control of the autonomous vehicle such as stopping, slowing, switching lanes, passing an obstacle, reversing, accelerating, taking a specific path, and so on. Other remote assistance actions can include generating a new target destination for the autonomous vehicle. In this way, if the current path is not viable, the remote operator can select one or more alternate destinations and thus cause the autonomous vehicle to take an alternate route.

In some example embodiments, the remote assistance actions can include opening a line of communication with a passenger (e.g., calling to speak with the passenger to get additional information, to reassure the passenger, or to give the passenger instructions). Other example remote assistance actions include summoning emergency services, ordering an alternate vehicle in case of the current autonomous vehicle being rendering inoperable, or connecting a passenger to a third-party.

The systems and methods described herein provide a number of technical effects and benefits. More particularly, the systems and methods of the present disclosure provide improved techniques for efficient situational analysis, interfacing, and communication between a service entity and an autonomous vehicle (or a passenger in an autonomous vehicle). For instance, when a request for remote assistance is received, the remote assistance toolbox feature enables an operator to quickly and efficiently view the most likely remote assistance actions for the situation. In addition, no remote assistance action that is unavailable in the current situation will be displayed in the remote assistance toolbox, preserving user interface space and avoiding the possibility of the operator mistakenly choosing such a remote assistance action. In this way, the remote assistance toolbox can increase operator response speed and accuracy, increase the overall efficiency of communications and commands, and improve the reliability of such communications. This improvement in accuracy and efficiency may result in lower power use, lower processing time and power use, and reduce mistakes made by operators. Doing so will decrease the time spent resolving the issues that result in a request for remote assistance and ultimately improving user experience.

Various means can be configured to perform the methods and processes described herein. For example, a computing system can include request receiving unit(s), data access unit(s), action selection unit(s), toolbox generation unit(s), action execution unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be configured to perform one or more algorithm(s) for carrying out the operations and functions described herein. For instance, the means can be configured to receive a request for remote assistance from an autonomous vehicle. A request receiving unit is one example of a means for receiving a request for remote assistance from an autonomous vehicle as described herein.

The means can be configured to determine from a local storage location and based at least in part on the request for remote assistance vehicle data associated with the autonomous vehicle. For example, the vehicle data can comprise data indicative of at least one of a location of the autonomous vehicle, an identification of the autonomous vehicle, a type of the autonomous vehicle, a vendor of the autonomous vehicle, one or more vehicle capabilities of the first autonomous vehicle, or an assistance type associated with the request for remote autonomous vehicle assistance. A data access unit is one example of a means for determining vehicle data associated with the autonomous vehicle.

The means can be configured to select, based at least in part on the vehicle data, a subset of remote assistance actions from a predetermined set of remote assistance actions. For example, an action selection system can use request parameters evaluate a plurality of potential remote assistance actions. An action selection unit is one example of a means for selecting, based at least in part on the one or more request parameters, a subset of remote assistance actions from a predetermined set of remote assistance actions.

The means can be configured to display, in a remote assistance user interface, one or more user interface elements indicative of the subset of remote assistance actions. For example, the means can be configured to customize a remote assistance user interface that includes one or more remote assistance toolboxes. A toolbox generation unit is one example of a means for displaying, in a remote assistance user interface, one or more user interface elements indicative of the subset of remote assistance actions.

The means can be configured to determine one or more remote assistance actions from the subset of remote assistance actions based at least in part on a user input associated with the one or more user interface elements and transmit to the autonomous vehicle, one or more control signals associated with the one or more remote assistance actions. For example, an operator can click on (or otherwise select) a remote assistance action. The remote assistance system can then transmit control signals to the associated autonomous vehicle to cause the remote assistance action to be performed. An action execution unit is one example of a means for determining one or more remote assistance actions from the subset of remote assistance actions based at least in part on a user input associated with the one or more user interface elements and transmitting to the autonomous vehicle, one or more control signals associated with the one or more remote assistance actions.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

FIG. 1 depicts a block diagram of an example vehicle computing system 100 for controlling the navigation of a vehicle according to example embodiments of the present disclosure. As illustrated, FIG. 1 shows a vehicle computing system 100 that can include a vehicle 105, a communication system 120, one or more sensors 125, autonomy system sensor data 140, a positioning system 150, an autonomy computing system 130, map data 145, a perception system 155, a prediction system 160, a motion planning system 165, perception data 170, prediction data 175, motion plan data 180, and a vehicle control system 135.

The vehicle computing system 100 can be associated with a service provider that can provide one or more vehicle services to a plurality of users 195 via a fleet of vehicles that includes, for example, the vehicle 105. The vehicle services can include transportation services (e.g., rideshare services), courier services, delivery services, and/or other types of services.

The vehicle computing system 100 can include multiple components for performing various operations and functions. For example, the vehicle computing system 100 can include and/or otherwise be associated with one or more computing devices that are remote from the vehicle 105. The one or more computing devices of the vehicle computing system 100 can include one or more processors and one or more memory devices. The one or more memory devices of the vehicle computing system 100 can store instructions that when executed by the one or more processors cause the one or more processors to perform operations and functions associated with operation of one or more vehicles (e.g., a fleet of vehicles), with the provision of vehicle services, and/or other operations as discussed herein.

The vehicle computing system 100 can communicate with the one or more remote computing systems 190 via one or more communications networks including a communications network. The communications network can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network can include a local area network (e.g. intranet), a wide area network (e.g. Internet), a wireless LAN network (e.g., via Wi-Fi), a cellular network, a SATCOM network, a VHF network, a HF network, a WiMAX based network, and/or any other suitable communications network (or combination thereof) for transmitting data to and/or from the vehicle 105. The remote computing system 190 can include a remote assistance system.

The vehicle 105 can be a ground-based vehicle (e.g., an automobile), an aircraft, and/or another type of vehicle. The vehicle 105 can be an autonomous vehicle that can perform various actions including driving, navigating, and/or operating, with minimal and/or no interaction from a human driver. The autonomous vehicle 105 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 105 can provide driving and navigational operation with minimal and/or no interaction from a human driver present in the vehicle. A semi-autonomous operational mode can be one in which the vehicle 105 can operate with some interaction from a human driver present in the vehicle. Park and/or sleep modes can be used between operational modes while the vehicle 105 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 105. Additionally, the vehicle 105 can provide data indicative of the state of the vehicle, the state of one or more passengers of the vehicle, and/or the state of an environment to the vehicle services system, which can store an indication, record, and/or other data indicative of the state of the one or more objects within a predefined distance of the vehicle 105 in one or more memory devices associated with the vehicle services system (e.g., remote from the vehicle). Furthermore, the vehicle 105 can provide data indicative of the state of the one or more objects (e.g., physical dimensions and/or appearance of the one or more objects) within a predefined distance of the vehicle 105 to the vehicle services system, which can store an indication, record, and/or other data indicative of the state of the one or more objects within a predefined distance of the vehicle 105 in one or more memory devices associated with the vehicle services system (e.g., remote from the vehicle).

The vehicle 105 can include and/or be associated with the vehicle computing system 100. The vehicle computing system 100 can include one or more computing devices located onboard the vehicle 105. For example, the one or more computing devices of the vehicle computing system 100 can be located on and/or within the vehicle 105. The one or more computing devices of the vehicle computing system 100 can include various components for performing various operations and functions. For instance, the one or more computing devices of the vehicle computing system 100 can include one or more processors and one or more tangible, non-transitory, computer readable media (e.g., memory devices). The one or more tangible, non-transitory, computer readable media can store instructions that when executed by the one or more processors cause the vehicle 105 (e.g., its computing system, one or more processors, and other devices in the vehicle 105) to perform operations and functions, including those described herein.

As depicted in FIG. 1, the vehicle computing system 100 can include the one or more sensors 125, a positioning system 150, an autonomy computing system 130, a communication system 120, and a vehicle control system 135. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more system sensors 125 can be configured to generate and/or store data including the sensor data 140 associated with one or more objects that are proximate to the vehicle 105 (e.g., within range or a field of view of one or more of the one or more sensors 125). The one or more autonomy system sensors 125 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The sensor data 140 can include image data, RADAR data, LIDAR data, and/or other data acquired by the one or more sensors 125. The one or more objects can include, for example, pedestrians, vehicles, bicycles, and/or other objects. The one or more sensors can be located on various parts of the vehicle 105 including a front side, rear side, left side, right side, top, or bottom of the vehicle 105. The sensor data 140 can be indicative of locations associated with the one or more objects within the surrounding environment of the vehicle 105 at one or more times. For example, sensor data 140 can be indicative of one or more LIDAR point clouds associated with the one or more objects within the surrounding environment. The one or more sensors 125 can provide the sensor data 140 to the autonomy computing system 130.

In addition to the sensor data 140, the autonomy computing system 130 can retrieve or otherwise obtain data including the map data 145. The map data 145 can provide detailed information about the surrounding environment of the vehicle 105. For example, the map data 145 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 100 in processing, analyzing, and perceiving its surrounding environment and its relationship thereto.

The vehicle computing system 100 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 105 can be used by various systems of the vehicle computing system 100 and/or provided to one or more remote computing devices. For example, the map data 145 can provide the vehicle 105 relative positions of the surrounding environment of the vehicle 105. The vehicle 105 can identify its position within the surrounding environment (e.g., across six axes) based at least in part on the data described herein. For example, the vehicle 105 can process the sensor data 140 (e.g., LIDAR data, camera data) to match it to a map of the surrounding environment to get an understanding of the vehicle's position within that environment (e.g., transpose the vehicle's position within its surrounding environment).

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can receive the sensor data 140 from the one or more sensors 125, attempt to determine the state of the surrounding environment by performing various processing techniques on the sensor data 140 (and/or other data), and generate an appropriate motion plan through the surrounding environment. The autonomy computing system 130 can control the one or more vehicle control systems 135 to operate the vehicle 105 according to the motion plan.

The perception system 155 can identify one or more objects that are proximate to the vehicle 105 based on sensor data 140 received from the sensors 125. In particular, in some implementations, the perception system 155 can determine, for each object, perception data 170 that describes a current state of such object. As examples, the perception data 170 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 155 can determine perception data 170 for each object over a number of iterations. In particular, the perception system 155 can update the perception data 170 for each object at each iteration. Thus, the perception system 155 can detect and track objects (e.g., vehicles, bicycles, pedestrians, etc.) that are proximate to the vehicle 105 over time, and thereby produce a presentation of the world around a vehicle 105 along with its state (e.g., a presentation of the objects of interest within a scene at the current time along with the states of the objects).

The prediction system 160 can receive the perception data 170 from the perception system 155 and predict one or more future locations and/or moving paths for each object based on such state data. For example, the prediction system 160 can generate prediction data 175 associated with each of the respective one or more objects proximate to the vehicle 105. The prediction data 175 can be indicative of one or more predicted future locations of each respective object. The prediction data 175 can be indicative of a predicted path (e.g., predicted trajectory) of at least one object within the surrounding environment of the vehicle 105. For example, the predicted path (e.g., trajectory) can indicate a path along which the respective object is predicted to travel over time (and/or the velocity at which the object is predicted to travel along the predicted path). The prediction system 160 can provide the prediction data 175 associated with the one or more objects to the motion planning system 165.

The motion planning system 165 can determine a motion plan and generate motion plan data 180 for the vehicle 105 based at least in part on the prediction data 175 (and/or other data). The motion plan data 180 can include vehicle actions with respect to the objects proximate to the vehicle 105 as well as the predicted movements. For instance, the motion planning system 165 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 180. By way of example, the motion planning system 165 can determine that the vehicle 105 can perform a certain action (e.g., pass an object) without increasing the potential risk to the vehicle 105 and/or violating any traffic laws (e.g., speed limits, lane boundaries, signage). The motion plan data 180 can include a planned trajectory, velocity, acceleration, and/or other actions of the vehicle 105.

As one example, in some implementations, the motion planning system 165 can determine a cost function for each of one or more candidate motion plans for the autonomous vehicle 105 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 105 approaches impact with another object and/or deviates from a preferred pathway (e.g., a predetermined travel route).

Thus, given information about the current locations and/or predicted future locations and/or moving paths of objects, the motion planning system 165 can determine a cost of adhering to a particular candidate pathway. The motion planning system 165 can select or determine a motion plan for the autonomous vehicle 105 based at least in part on the cost function(s). For example, the motion plan that minimizes the cost function can be selected or otherwise determined. The motion planning system 165 then can provide the selected motion plan to a vehicle controller that controls one or more vehicle controls (e.g., actuators or other devices that control gas flow, steering, braking, etc.) to execute the selected motion plan.

The motion planning system 165 can provide the motion plan data 180 with data indicative of the vehicle actions, a planned trajectory, and/or other operating parameters to the vehicle control systems 135 to implement the motion plan data 180 for the vehicle 105. For instance, the vehicle 105 can include a mobility controller configured to translate the motion plan data 180 into instructions. By way of example, the mobility controller can translate a determined motion plan data 180 into instructions for controlling the vehicle 105 including adjusting the steering of the vehicle 105 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 180.

The vehicle computing system 100 can include a communications system 120 configured to allow the vehicle computing system 100 (and its one or more computing devices) to communicate with other computing devices. The vehicle computing system 100 can use the communications system 120 to communicate with the operations computing system and/or one or more other remote computing devices (e.g., the one or more remote computing devices) over one or more networks (e.g., via one or more wireless signal connections, etc.). In some implementations, the communications system 120 can allow communication among one or more of the system on-board the vehicle 105. The communications system 120 can also be configured to enable the autonomous vehicle to communicate with and/or provide and/or receive data and/or signals from a remote computing device associated with a user and/or an item (e.g., an item to be picked-up for a courier service). The communications system 120 can utilize various communication technologies including, for example, radio frequency signaling and/or Bluetooth low energy protocol. The communications system 120 can include any suitable components for interfacing with one or more networks, including, for example, one or more: transmitters, receivers, ports, controllers, antennas, and/or other suitable components that can help facilitate communication. In some implementations, the communications system 120 can include a plurality of components (e.g., antennas, transmitters, and/or receivers) that allow it to implement and utilize multiple-input, multiple-output (MIMO) technology and communication techniques.

The vehicle computing system 100 can include the one or more human-machine interfaces. For example, the vehicle computing system 100 can include one or more display devices located on the vehicle computing system 100. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat).

Figure 2:
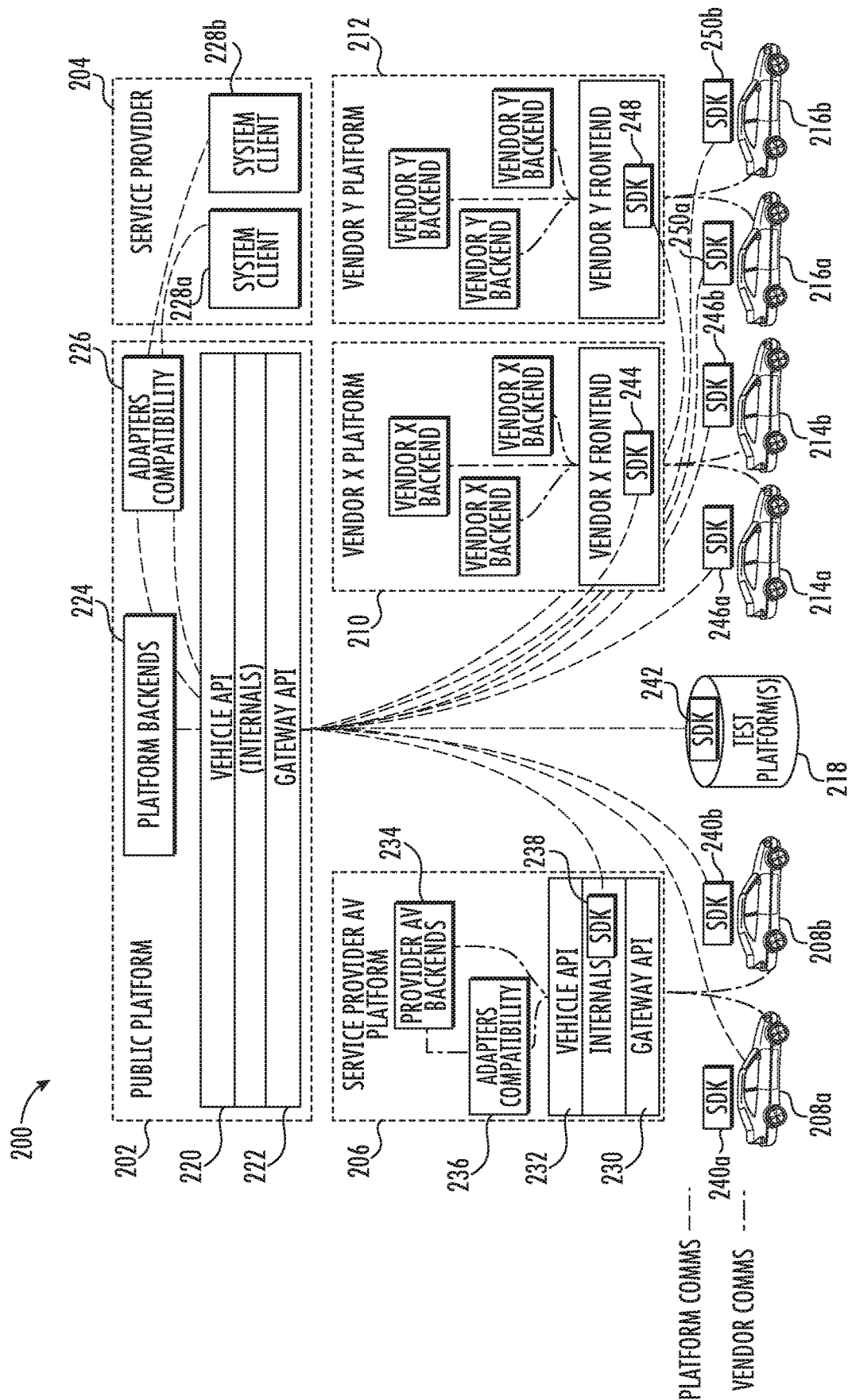
FIG. 2 depicts an example system architecture according to example aspects of the present disclosure.

FIG. 2 depicts an example service infrastructure 200 according to example embodiments of the present disclosure. As illustrated in FIG. 2, an example service infrastructure 200, according to example embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b. In some implementations, the VIP component described herein can include one or more of the platforms and related components illustrated in the service infrastructure 200 of FIG. 2.

As described herein, a service infrastructure 200 can include a public platform 202 to facilitate vehicle services (e.g., provided via one or more system clients (228a, 228b) associated with a service provider operations computing system) between the service provider system 204 (e.g., operations computing system, etc.) and vehicles associated with one or more entities (e.g., associated with the service provider (208a, 208b), associated with third-party entities (214a, 214b, 216a, 216b), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. An autonomous vehicle can provide a communication to the public platform 202 to call a function of a backend interface. In this way, the backend interfaces can be an external facing edge of the service provider system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single-entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to which to provide access.

Figure 3:
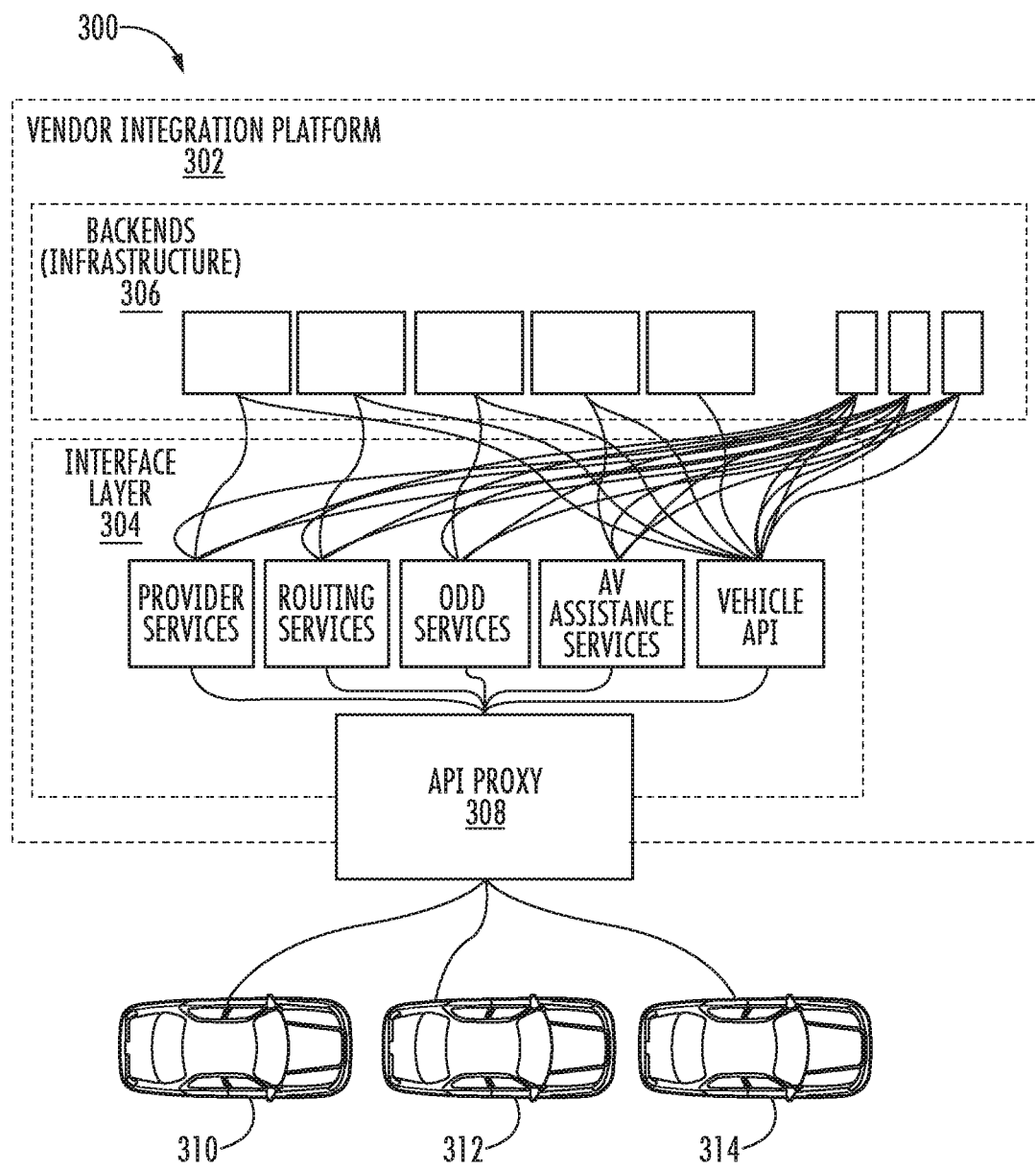
FIG. 3 depicts an example of a multiple entity integration platform according to example embodiments of the present disclosure.

FIG. 3 depicts an example of an entity integration platform 300 according to example embodiments of the present disclosure. As illustrated in FIG. 3, an entity integration platform 300 can include a vendor integration platform (e.g., public platform) 302 in communication with one or more vehicles, such as autonomous vehicles 310, 312, and 314. As described in regard to FIG. 2, the public platform 302 can provide for communication between a plurality of backend services 306 and one or more autonomous vehicles (e.g., 310, 312, and/or 314) via a plurality of interfaces 304. As such, public platform 302 of FIG. 3 can in some embodiments correspond to public platform 202 of FIG. 2, while backend services 306 and/or interfaces 304 of FIG. 3 can in some embodiments correspond to backend interfaces 224 of FIG. 2 and corresponding applications, interfaces, and the like. In some implementations, the public platform 302 can include application programming interface (API) proxy 308 to act as a central gateway to the public platform 302 for communications to/from the autonomous vehicles. In some embodiments, an autonomous vehicle (e.g., 310, 312, and/or 314) can communicate with the API proxy 308 via an SDK associated with the autonomous vehicle, as described herein.

Figure 4:
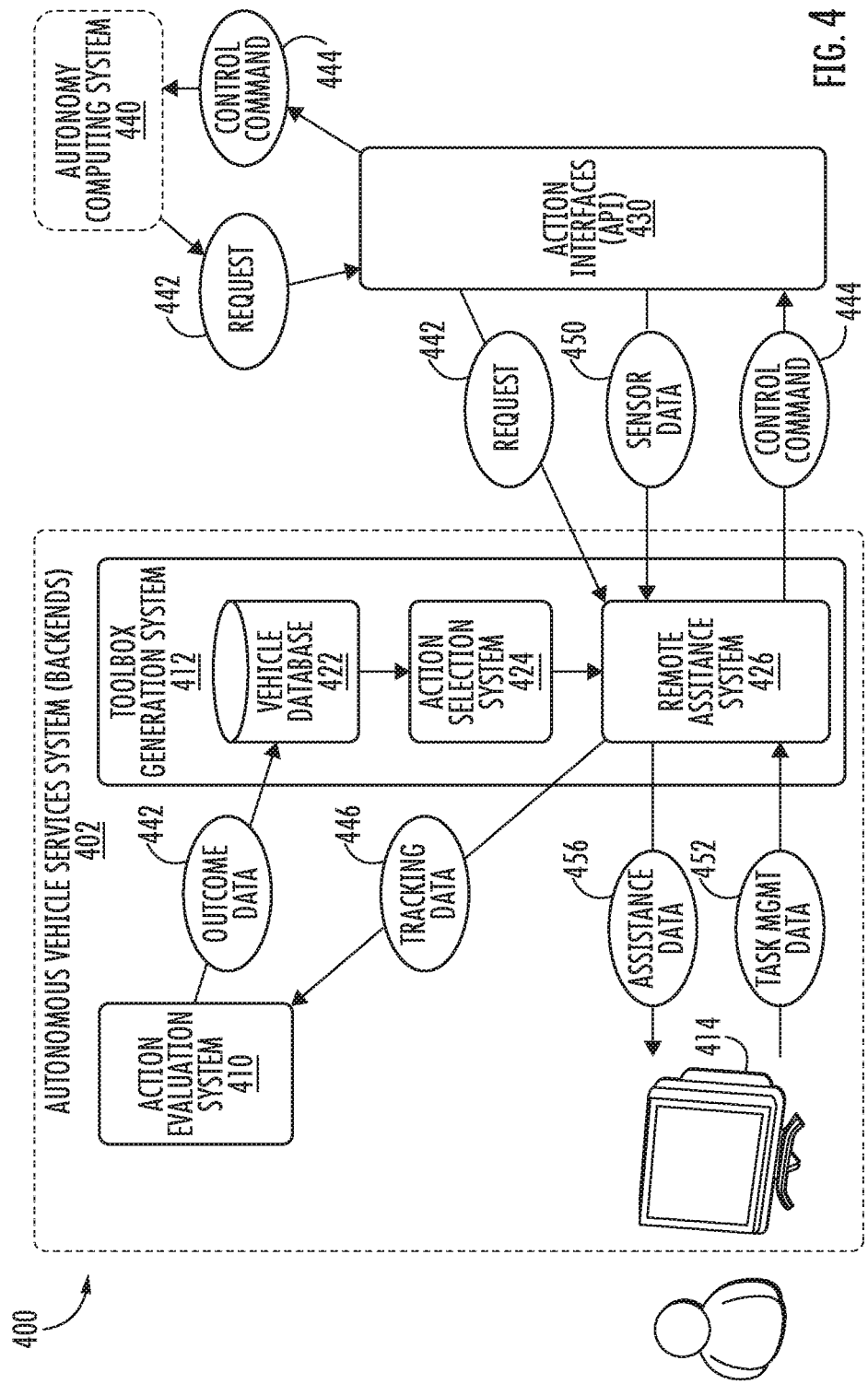
FIG. 4 depicts an example computing system for providing remote autonomous vehicle assistance to autonomous vehicles according to example embodiments of the present disclosure.

FIG. 4 depicts an example computing system 400 for providing remote autonomous vehicle assistance to autonomous vehicles according to example embodiments of the present disclosure. The computer system 400 can include an autonomous vehicle system 402, one or more vehicle interfaces 430 (e.g., API(s)), and one or more autonomy computing systems 440. The autonomous vehicle system 402 can include a toolbox generation system 412, an action evaluation system 410, and one or more operator computing systems 414.

The toolbox generation system 412 can be configured to process requests 442 for remote assistance, customize a user interface for a display at an operator computing system 414, and generate one or more control commands 444 for an autonomy computing system 440 of an autonomous vehicle in response to the requests 442. The action evaluation system 410 can use tracking data 446 to generate data associated with requests for remote assistance and the remote assistance actions selected by remote operators to resolve those requests for remote assistance. In some examples, a remote assistance system 426 may provide tracking data to the action evaluation system 410. The tracking data 446 may identify a particular request for remote assistance, one or more remote assistance actions selected by a remote operator, and data indicating whether the one or more remote assistance actions selected by an operator resolved the issue associated with the request for remote assistance. The tracking data 446 may include data indicative of a particular vehicle, vehicle type, geographic area, time, and/or assistance type associated with the assisted autonomy task. In some implementations, the tracking data 446 may be indicative of the capabilities (e.g., ability to travel in snowfall, make unprotected left turns, make U-turns, etc.) or lack thereof of the vehicles that the operator has assisted. The action evaluation system 410 can generate task management data 452 for each request for remote assistance. The task management data 452 can include data describing the one or more remote assistance actions selected by an operator in response to the request to remote assistance. The task management data 452 can include data describing the outcome of the remote assistance actions, including a designation indicating whether the remote assistance action was successful. The task management data 452 can be stored in the vehicle database 422 as vehicle data.

One or more vehicle interfaces 430 (e.g., an API available to the autonomy computing system 440) of an operations computing system may receive a request 442 from an autonomous vehicle for remote autonomous assistance with one or more autonomy computing system 440 tasks at the autonomy computing system 440. The vehicle interface 430 can pass the request 442 and/or one or more request parameters to a remote assistance system 426 of the toolbox generation system 412. The action selection system 424 can obtain the request 442 and associated vehicle data from the remote assistance system 426 or the vehicle database 422. The vehicle data may be included with the request 442 as received from the autonomy computing system 440 or may be derived from the request 442 (e.g., by analyzing data included within the request and retrieving the associated vehicle data from the vehicle database 422). Thus, the vehicle data may be accessed from a local storage location based on the request 442 for remote assistance. In some examples, the request for remote assistance can include one or more request parameters that the remote assistance system 426 can use to access the appropriate vehicle data from the vehicle database (e.g., a vehicle identifier).

In some examples, a request 442 for remote autonomous vehicle assistance may be received from a computing device separate from the autonomous vehicle. For example, a user of an autonomous vehicle service may send a request 442 for autonomous vehicle assistance using a client device such as a smartphone, tablet, etc. A client device may initiate a telephone call to connect the user with an operations computing system. In some examples, an operations computing system associated with the autonomy computing system 440 can match a telephone number or other identifier with a particular user or autonomous vehicle.

The action selection system 424 can access the vehicle database 422 to obtain a plurality of remote assistance actions. The action selection system 424 can access vehicle data using information included in the request 442 to identify one or more remote assistance actions based on the vehicle data. The action selection system 424 can select a subset of remote assistance actions based on the vehicle data.

For example, the action selection system 424 can access vehicle data associated with the capabilities of an autonomous vehicle associated with the request for remote assistance. The vehicle capabilities associated with a particular autonomous vehicle can describe which actions the vehicle is able to perform. Example autonomous vehicle capabilities can include the ability to travel during snowfall, make unprotected left turns, make U-turns, and so.

In one example, the action selection system 424 can access vehicle data (e.g., from the vehicle database 422 or included in the request for remote assistance itself) associated with a fleet operator associated with the autonomous vehicle. A fleet operator can be an entity that owns and/or operates one or more autonomous vehicles that are associated with the service entity. A respective fleet operator can establish which remote assistance actions are available for autonomous vehicles associated with the respective fleet operator. In this way, a fleet operator can determine what level of autonomous access to allow a remote operator to have when selecting remote assistance actions. The action selection system 424 can identify a specific fleet operator for a given autonomous vehicle based on the vehicle data associated with this request. Once a specific fleet operator is identified, the action selection system 424 can select a subset of remote assistance actions based on the identified fleet operator.

In some example embodiments, the action selection system 424 can identify a particular request type based on the vehicle data. A request type can identify the category of assistance that is being requested in the request for remote assistance. Example request types can include, but are not limited to, object classification, obstacle navigation, emergency aid request, route planning assistance request, and vehicle malfunction request. In some examples, a respective request type can be associated with a plurality of remote assistance actions. The action selection system 424 can select a plurality of remote assistance actions based on the identified request type. For example, if the identified request type is an object classification request, the action selection system 424 can select remote assistance actions associated with object classification including, but not limited to, a list of common object classifications.

In some example embodiments, the action selection system 424 can obtain data associated with past requests for remote assistance from the vehicle database 422, the past requests including associated vehicle data and one or more associated remote assistance actions. The action selection system 424 can identify an association between one or more previous requests for remote assistance and the current request for remote assistance based on a correspondence between the vehicle data associated with the one or more previous requests for remote assistance and the vehicle data associated with the current request for remote assistance. The action selection system 424 can select one or more remote assistance actions based on the remote assistance actions associated with the one or more previous requests for remote assistance. For example, if the action selection system 424 receives a request for remote assistance with object classification at a particular location, the action selection system 424 can determine, using data in the vehicle database 422, if past requests for remote assistance have been received with the same request type and a similar location. If so, the action selection system 424 can determine which remote assistance actions have been taken in the past and whether those actions were successful. The action selection system 424 can select one or more successful remote assistance actions from the one or more past requests for remote assistance.

The action selection system 424 can provide the subset of selected remote assistance actions to the remote assistance system 426. The remote assistance system 426 can provide assistance data 456 to a computer computing system 414 associated with a remote assistance operator. The assistance data 456 can include information used to provide a customized remote assistance interface that can facilitate one or more responses to the request for remote assistance and includes one or more remote assistance toolboxes that include user interface elements associated with the selected remote assistance actions. The assistance data 456 can also include sensor data 450 received from an autonomous vehicle.

For example, the remote assistance interface may include an interface area for displaying camera data, LIDAR data, and information about the autonomous vehicle. The user interface can include one or more remote assistance toolboxes, each of which includes one or more interface elements associated with a remote assistance action. In some example embodiments, a remote assistance toolbox can be positioned in the remote assistance user interface near or proximate to a relevant portion of the sensor data (e.g., an obstacle may be highlighted in the interface and a remote assistance toolbox may be positioned nearby the highlighted obstacle). In some examples, a specific area of the remote assistance user interface is dedicated to displayed one or more remote assistance toolboxes. For example, a user interface can include a sidebar area into which user interface elements associated with specific remote assistance actions are displayed. The whole sidebar may be referred to as a toolbox or only the area that includes user interface elements associated with remote assistance actions may be referred to as a toolbox.

An operator may analyze the sensor data 450 provided by the autonomy computing system 440 and the information included in the remote assistance user interface (e.g., including the customized remote assistance toolboxes) in order to generate a selection action using an operator computing system (414). As a particular example, an autonomous vehicle may issue a request 442 for assistance with classifying an object. An operator may view one or more images of the unclassified object and review the one or more remote assistance actions presented in a remote assistance toolbox. The operator can provide an input to an operator computing system 414 indicating selection of one or more remote assistance actions displayed in a remote assistance toolbox (e.g., identifying the unclassified object). The remote assistance system 426 can generate a classification for the object. The classification of the object or other information may comprise the selected action that is provided from the operator computing system 414 to the remote assistance system 426 in the task management data 452. The remote assistance system 426 can generate one or more control commands 444 (herein also referred to as control messages) to the autonomy computing system 440 of the autonomous vehicle including data indicative of the classification generated by the remote assistance system 426 from the user input.

As another example, an operator may view sensor data 450 and select a remote assistance action that includes providing path assistance such as an indication of a general path for the autonomous vehicle to travel within a geographical area. For example, the remote operator may provide an input to generate one or more points (e.g., location coordinates) through which the autonomous vehicle should travel. The one or more points and/or other data may comprise a selected action that is provided from an operator computing system 414 to the remote assistance system 426 in the task management data 452. The remote assistance system 426 can generate one or more control commands 444 including data indicative of the target vehicle path provided by the operator. The autonomy computing system 440 of the autonomous vehicle can receive the path information and generate an appropriate motion plan to follow the identified path.

Figure 5:
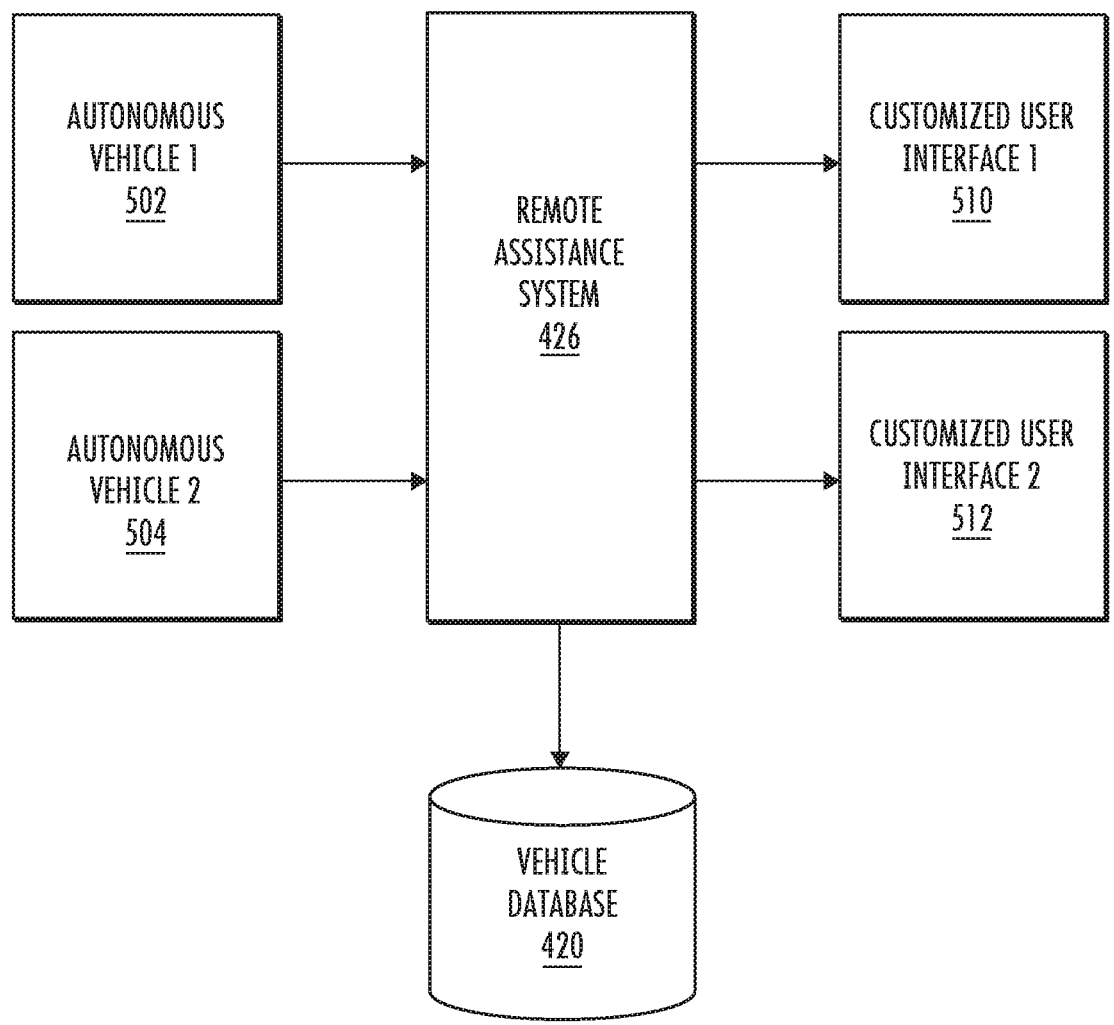
FIG. 5 depicts an example block diagram of a system for providing customized user interfaces based on vehicle data according to example aspects of the present disclosure.

FIG. 5 depicts an example block diagram of a system for providing customized user interfaces based on vehicle data according to example aspects of the present disclosure. In this example, remote assistance system 426 receives a request for remote assistance from a plurality of different autonomous vehicles. For each particular request for remote assistance, the remote assistance system 426 generates a customized user interface for that particular request for remote assistance.

In this example, autonomous vehicle 1 502 can transmit a request for remote assistance to the remote assistance system 426. The remote assistance system 426 can then access vehicle data associated with the request for remote assistance. Based on the accessed vehicle data, the remote assistance system can, as described above, generate a first customized user interface (e.g., custom user interface 1 510). The remote assistance system 426 can access vehicle database 420 to select one or more remote assistance action based on the vehicle data. The remote assistance system 426 can create one or more remote assistance toolboxes and customize the user interface by, at least in part, displaying the created one or more remote assistance toolboxes in the customized user interface (in this case customized user interface 1 510).

Continuing this example, a second autonomous vehicle (autonomous vehicle 2 504) can also send a request for remote assistance to the remote assistance system 426. The remote assistance system 426 can identify vehicle data associated with the request for remote assistance from autonomous vehicle 2 504. The vehicle data associated with the request for remote assistance from autonomous vehicle 2 504 can be different from the vehicle data associated with the request for remote assistance from autonomous vehicle 1 502.

As a result, the remote assistance system 426 can generate a customized user interface in response to the request for remote assistance from autonomous vehicle 2 504 (customized user interface 2 512) that differs from the customized user interface generated in response to the request for remote assistance from autonomous vehicle 1 502 (customized user interface 1 510). Specifically, the remote assistance system 426 can access the vehicle database 420 and select one or more remote assistance actions for customized user interface 2 512 that differ from the remote assistance actions selected for customized user interface 1 510. By customizing the remote assistance action included in one or more remote assistance toolboxes displayed in the user interface 510 the remote assistance system 426 can improve the efficiency and reliability of the remote assistance interface by providing the remote assistance actions that are most likely to be appropriate for each request for remote assistance.

Figure 6A:
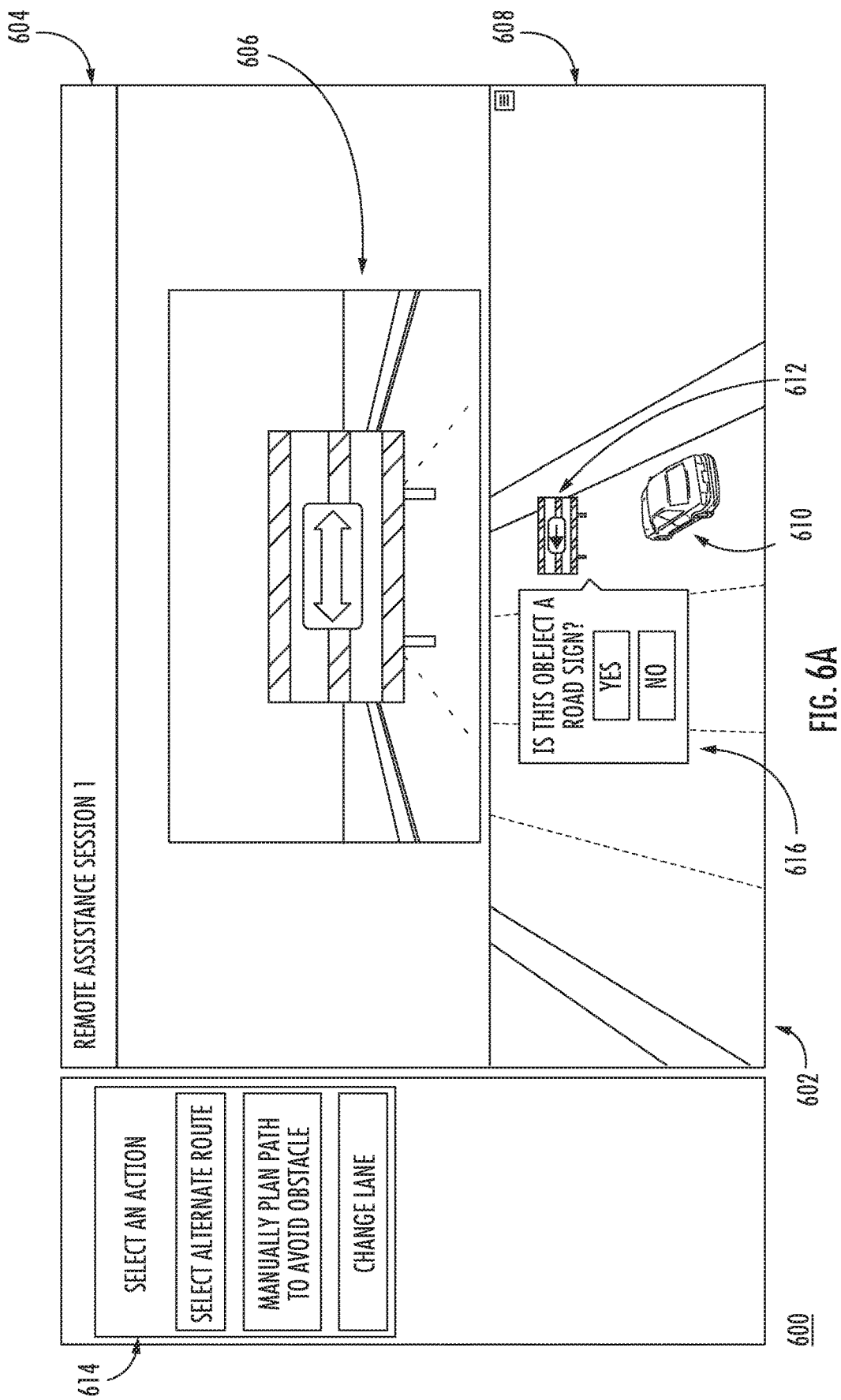
FIGS. 6A and 6B depict an example user interface for providing remote assistance to an autonomous vehicle according to example aspects of the present disclosure.

FIG. 6A depicts an example user interface 600 for providing remote assistance to an autonomous vehicle according to example aspects of the present disclosure. In this example, a remote assistance user interface 602 can include a plurality of user interface elements that provide information to a remote operator. The user interface 602 can include a title bar 604. The title bar 604 can include information describing the current remote assistance session (e.g., remote assistance session 1). In some examples, the title bar 604 can include information from one or more request parameters including, but not limited to, a vehicle identifier, a vehicle type, a request type, and so on.

The remote assistance interface 602 can include a first sensor data display area 606. For example, the first sensor data display area 606 can display data captured from one or more cameras included in the autonomous vehicle associated with the request for remote assistance. In this example, the first sensor data display area 606 can display video of a multi-lane road and a traffic barricade. The remote operator can view the data displayed in the first sensor display area 606 to assist in selecting an appropriate remote assistance action.

The remote assistance interface 602 can include a second sensor data display area 608. In this example, the second sensor data display area 608 can display LIDAR data received captured from a LIDAR sensor associated with the autonomous vehicle associated with the request for remote assistance. In this example, the LIDAR data displayed in the second sensor data display area 608 can include a representation of an autonomous vehicle 610, one or more highlighted elements of interest 612 (in this case a representation of the position of the traffic barrier in the path of the autonomous vehicle).

The remote assistance interface 602 can include one or more remote assistance toolboxes. A first remote assistance toolbox 614 is displayed in the sidebar of the remote assistance interface 602. The first remote assistance toolbox 614 includes user interface elements selected based on vehicle data associated with the request for remote assistance. This first remote assistance toolbox can be customized to provide relevant and useful remote assistance actions based on a variety of criteria as discussed above.

The remote assistance interface 602 can include a second remote assistance toolbox 616. The second remote assistance toolbox 616 can be positioned proximate to one or more highlighted elements of interest 612. The second remote assistance toolbox 616 can include user interface elements associated with remote assistance actions that are similar to those displayed in the first remote assistance toolbox 614. For example, the first remote assistance toolbox 614 can include suggested remote assistance actions "plan alternate route," "manually plan a path to avoid the obstacle," and "change lane." These suggested remote assistance actions may differ in scope and the level of control exercised by the remote operator. The second remote assistance toolbox 616 can include suggested remote assistance actions that are similar to or different from those presented in the first remote assistance toolbox 614. Thus, the second remote assistance toolbox 616 can include interface elements associated with the "classify object remote assistance action. In this example, the second remote assistance toolbox 616 includes a question "Is this object a road sign?" and includes the option to select yes or no.

Figure 6B:
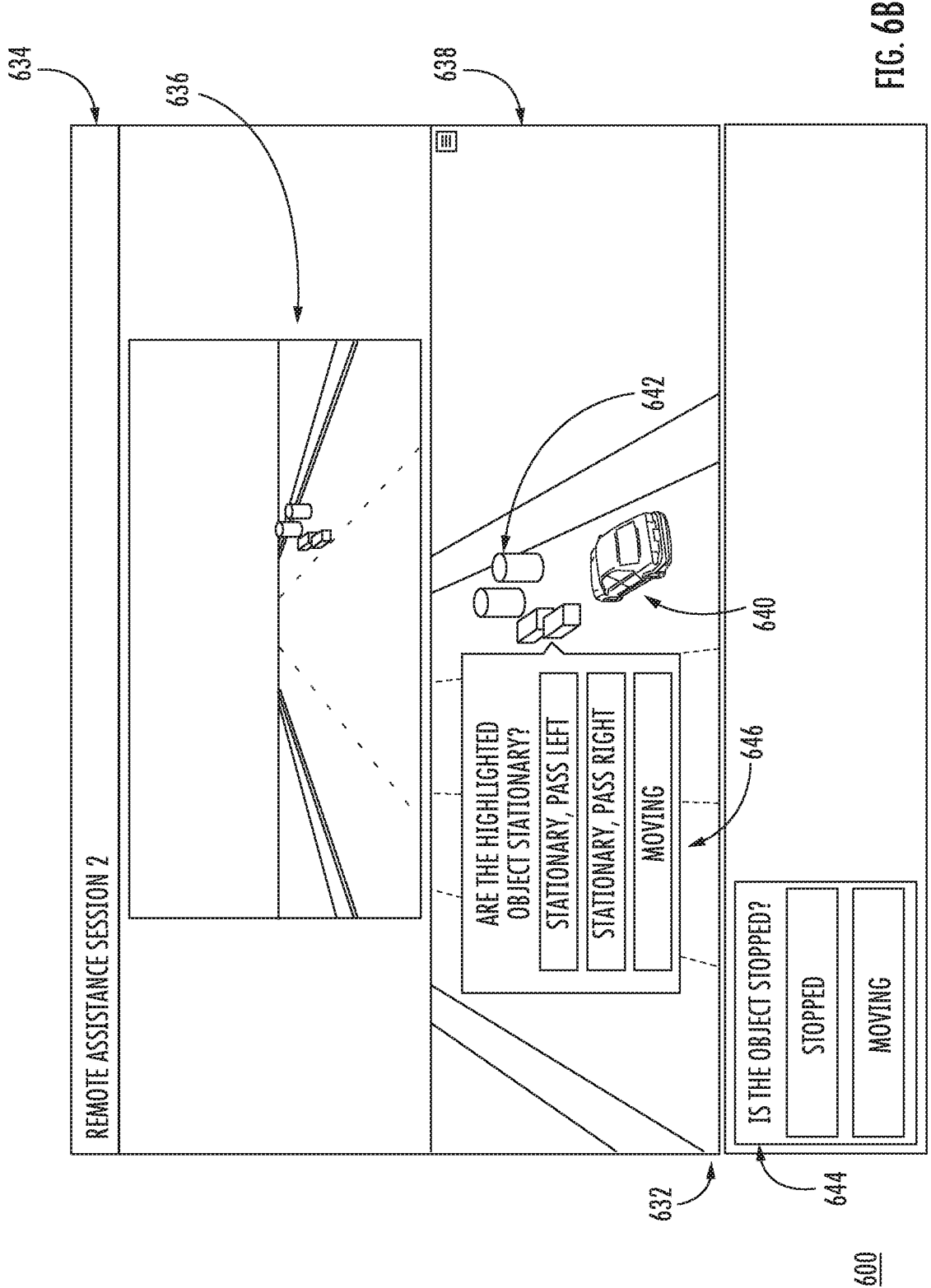

FIG. 6B depicts an example user interface 600 for providing remote assistance to an autonomous vehicle according to example aspects of the present disclosure. It should be noted that while the user interface example shown in FIG. 6B has similarities with the user interface example shown in FIG. 6A, each user interface example has been customized in response to specific vehicle data associated with each request for remote assistance.

In this example, a remote assistance user interface 632 can include a plurality of user interface elements that provide information to a remote instance operator. The user interface 632 can include a title bar 634. The title bar 634 can include information describing the current remote assistance session (e.g., remote assistance session 2). The remote assistance interface 632 can include a first sensor data display area 636. For example, the first sensor data display area 636 can display data captured from one or more cameras included in the autonomous vehicle associated with the request for remote assistance. In this example, the first sensor data display area 636 can display video of a multi-lane road and three or more objects in the roadway. The remote operator can view the data displayed in the first sensor display area 636 to assist the remote operator in selecting an appropriate remote assistance action.

The remote assistance interface 632 can include a second sensor data display area 638. In this example, the second sensor data display area 638 can display LIDAR data received captured from a LIDAR sensor associated with the autonomous vehicle associated with the request for remote assistance. In this example, the LIDAR data displayed in the second sensor data display area 638 can include a representation of an autonomous vehicle 640, one or more highlighted elements of interest 642 (in this case a representation of the position of the 3 objects in the path of the autonomous vehicle).

The remote assistance interface 632 can include one or more remote assistance toolboxes. A first remote assistance toolbox 644 is displayed in a bar on the bottom of the remote assistance interface 632. The first remote assistance toolbox 644 includes user interface elements selected based on one or more request parameters associated with the request for remote assistance. This first remote assistance toolbox 644 can be customized to provide relevant and useful remote assistance actions based on a variety of criteria as discussed above.

The remote assistance interface 632 can include a second remote assistance toolbox 646. The second remote assistance toolbox 646 can be positioned proximate to one or more highlighted elements of interest 642. The second remote assistance toolbox 646 can include user interface elements associated with remote assistance actions that are similar to those displayed in the first remote assistance toolbox 644. In this example, the first remote assistance toolbox 644 can include a prompt reading "Is the object stopped?" with selectable answers including "Stopped" and "Moving." The second remote assistance toolbox 646 can include suggested remote assistance actions that are similar to or different from those presented in the first remote assistance toolbox 644. Thus, the second remote assistance toolbox 646 can include a prompt "Are the highlighted objects stationary?" and a series of potential responses associated with remote assistance actions such as "stationary, pass left," "stationary, pass right," and "moving." Once an operator selects at least one option, a remote assistance system (e.g., remote assistance system 426 in FIG. 4) can generate one or more control signals that will cause the autonomous vehicle to execute the associated remote assistance action.

Figure 7:
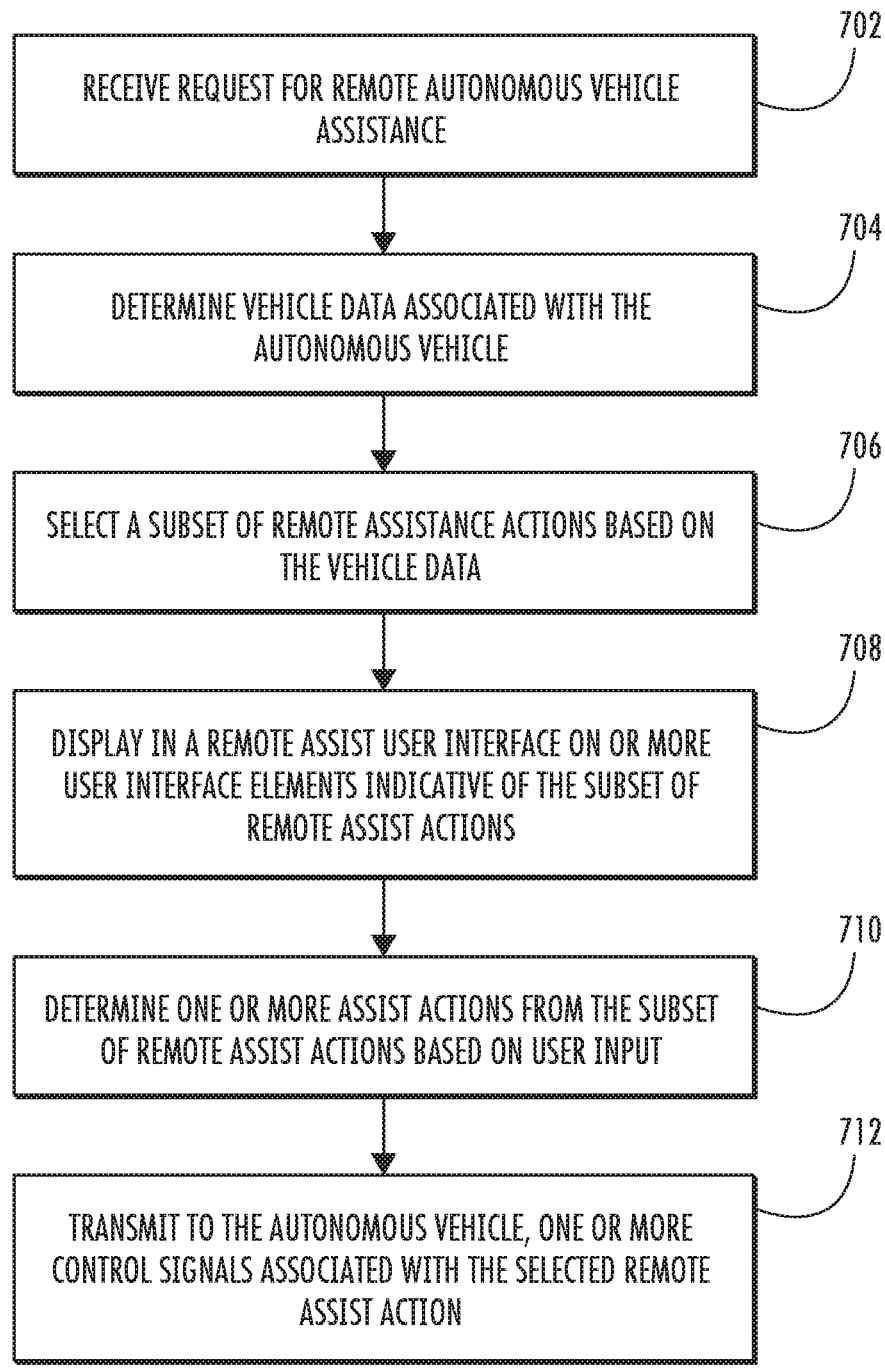
FIG. 7 depicts a flowchart illustrating an example method for initiating remote assistance according to example embodiments of the present disclosure.

FIG. 7 depicts a flowchart illustrating an example method for initiating remote assistance according to example embodiments of the present disclosure. In some embodiments, a remote assistance system (e.g., remote assistance system 426 in FIG. 4) receives, at 702, a request for remote assistance from an autonomous vehicle. In some examples, a request for remote assistance can also be generated by a computing device associated with a passenger in an autonomous vehicle.

The remote assistance system can determine, at 704, from a local storage location and based at least in part on the request for remote assistance, vehicle data associated with the autonomous vehicle. In some examples, the vehicle data can be at least partially included with the request for remote assistance. For example, the request for remote assistance can include metadata or parameters that allow the remote assistance system to identify the specific autonomous vehicle making the request. In some examples, the request for remote assistance can use this vehicle identification to access vehicle data associated with the identified autonomous vehicle from a local database. In some examples, the remote assistance system accesses at least one item of vehicle data from a local storage location based on the request for remote assistance. The vehicle data can comprise data indicative of at least one of a location of the autonomous vehicle, an identification of the autonomous vehicle, a type of the autonomous vehicle, a vendor associated with the autonomous vehicle, one or more vehicle capabilities of the first autonomous vehicle, or an assistance type associated with the request for remote autonomous vehicle assistance.

In some examples, the remote assistance system can select, at 706, based at least in part on the vehicle data, a subset of remote assistance actions from a predetermined set of remote assistance actions. In some example embodiments, the remote assistance system can display image data received from the autonomous vehicle, wherein the image data is displayed in response to selecting the subset of remote assistance actions.

In some examples, the remote assistance system can display, at 708, one or more user interface elements indicative of the subset of remote assistance actions. In some examples, the user interface elements are displayed in a specific remote assistance toolbox element in the user interface. In some examples, each user interface element is displayed individually in the remote assistance user interface and the entire user interface serves as the user interface toolbox.

The remote assistance system can determine, at 710, one or more remote assistance actions from the subset of remote assistance actions based at least in part on a user input associated with the one or more user interface elements. For example, a remote operator can click on (or otherwise select) a particular user interface element to indicate that the associated remote assistance action should be performed.

The remote assistance system can transmit, at 712, one or more control signals associated with the one or more remote assistance actions. In some examples, the remote assistance system can determine, based on at least one request parameter, that the autonomous vehicle is associated with a first fleet operator. In response to the determination, the remote assistance system can transmit the one or more control systems to the autonomous vehicle. In this example, the first fleet operator can be the service entity and the autonomous vehicle is a first-party vehicle. In some examples, the remote assistance system can determine, based vehicle data, that the autonomous vehicle is associated with a second fleet operator. In response, the remote assistance system can transmit the one or more control signals to a server associated with the second fleet operator of the autonomous vehicle. In this example, the second fleet operator is not the service entity and the autonomous vehicle can be a third-party vehicle.

Figure 8:
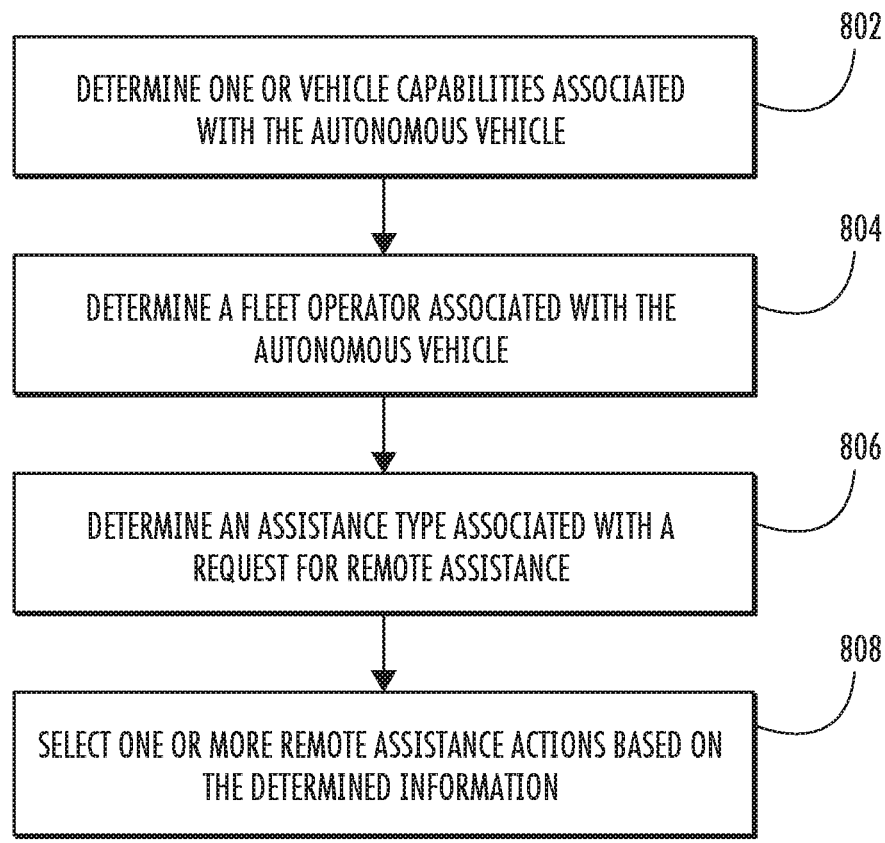
FIG. 8 depicts a flowchart illustrating an example method for selecting one or more remote assistance actions according to example embodiments of the present disclosure

FIG. 8 depicts a flowchart illustrating an example method for selecting one or more remote assistance actions according to example embodiments of the present disclosure. In some examples, the action selection system (e.g., action selection system 424 in FIG. 4) can determine, at 802, one or more vehicle capabilities of the autonomous vehicle based at least in part on the vehicle data. The action selection system can determine a subset of remote assistance actions based at least in part on the one or more vehicle capabilities. Thus, certain remote assistance actions can be made available only when the requesting autonomous vehicle has capabilities that enable it to perform those actions (e.g., driving in snow, driving in reverse, making a U-turn, and so on.)

In some examples, the action selection system can determine, based on the vehicle data, a fleet operator associated with the autonomous vehicle. The action selection system can determine a subset of remote assistance actions based at least in part on the fleet operator. For example, each fleet operator can determine which remote assistance actions are to be available for autonomous vehicles associated with that fleet operator. The action selection system can determine a first subset of remote assistance actions in response to determining that a first fleet operator is associated with the autonomous vehicle and determine a second subset of remote assistance actions in response to determine that a second fleet operator is associated with the autonomous vehicle. In some example embodiments, the first subset of remote assistance actions is associated with a first level of remote autonomous control of the autonomous vehicle and the second subset of remote assistance actions is associated with a second level of remote autonomous control of the autonomous vehicle.

The action selection system can obtain data associated with past requests for remote assistance, the past requests including one or more request parameters and one or more associated remote assistance actions. Using the obtained information, the action selection system identifies an association between one or more previous requests for remote assistance and the current request for remote assistance based on a correspondence between the one or more requests parameters associated with the one or more previous requests for remote assistance and the one or more request parameters associated with the current request for remote assistance.

The action selection system can select, at 808, one or more remote assistance actions based on the remote assistance actions associated with the one or more previous requests for remote assistance or other information determined from the vehicle data. In some example embodiments, a first assistance type is associated with a first subset of remote assistance actions and a second assistance type is associated with a second subset of remote assistance actions.

In some examples, the first assistance type can be associated with a request for assistance with object classification and the associated subset of remote assistance actions can include remote assistance actions associated with object classification. In some examples, the subset of remote assistance actions associated with object classification can include a list of common object classifications. For example, common object classifications can include a vehicle, a person, a building, and so on.

In some examples, the first assistance type can be associated with a request for assistance with obstacle navigation and the associated subset of remote assistance actions includes remote assistance actions associated with autonomous vehicle pathing. In some example embodiments, the remote assistance actions can be associated with autonomous vehicle pathing such as a path designation action.

In some examples, the one or more request parameters can comprise data indicating that the request type is for path assistance associated with a motion plan at a first geographic area and the request for path assistance is associated with at least one remote assistance action of the subset of remote assistance actions. The subset of remote assistance actions associated with the request for path assistance can include rerouting the autonomous vehicle from a current path to an alternate path. The subset of remote assistance actions associated with the request for path assistance can include generating a target vehicle path for the autonomous vehicle.

Figure 9:
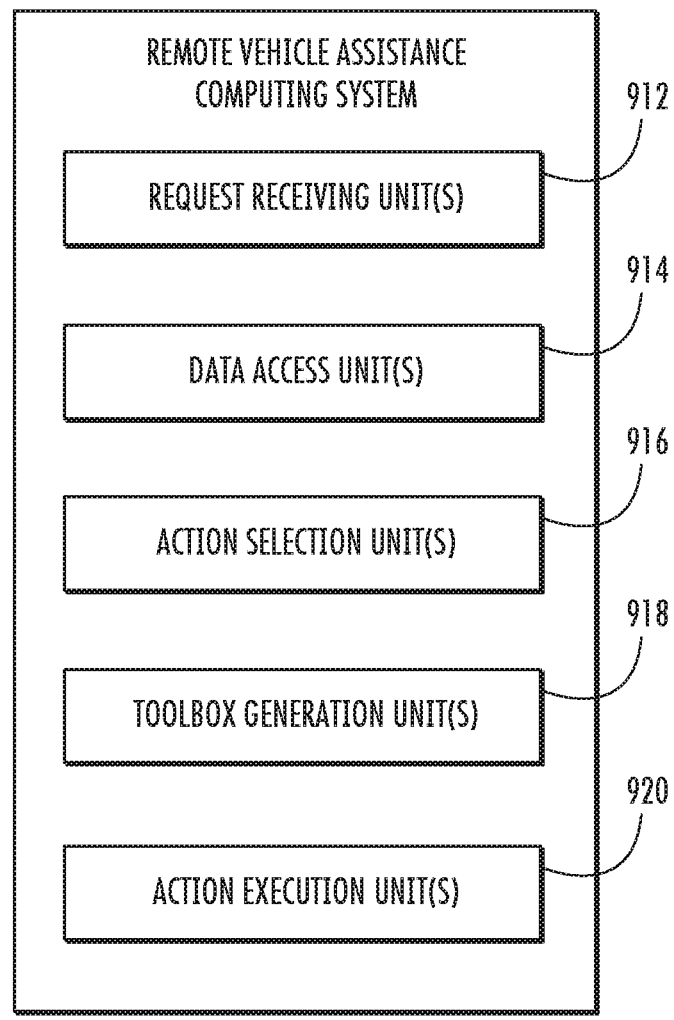
FIG. 9 depicts an example system with units for performing operations and functions according to example aspects of the present disclosure.

Various means can be configured to perform the methods and processes described herein. For example, FIG. 9 depicts a diagram of an example computing system that can include request receiving unit(s) 912, data access unit(s) 914, action selection unit(s) 916, toolbox generation unit(s) 918, action execution unit(s) 920, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be configured to perform one or more algorithm(s) for carrying out the operations and functions described herein. For instance, the means can be configured to receive a request for remote assistance from an autonomous vehicle. A request receiving unit 912 is one example of a means for receiving a request for remote assistance from an autonomous vehicle as described herein.

The means can be configured to determine, from a local storage location and based at least in part on the request for remote assistance, vehicle data associated with the autonomous vehicle. For example, the vehicle data can comprise data indicative of at least one of a location of the autonomous vehicle, an identification of the autonomous vehicle, a type of the autonomous vehicle, a vendor of the autonomous vehicle, one or more vehicle capabilities of the first autonomous vehicle, or an assistance type associated with the request for remote autonomous vehicle assistance. A data access unit 914 is one example of a means for determining vehicle data associated with an autonomous vehicle based on data included in the request for remote assistance.

The means can be configured to select, based at least in part on vehicle data, a subset of remote assistance actions from a predetermined set of remote assistance actions. For example, an action selection system can use vehicle data to evaluate a plurality of potential remote assistance actions. An action selection unit 916 is one example of a means for selecting, based at least in part on the vehicle data, a subset of remote assistance actions from a predetermined set of remote assistance actions.

The means can be configured to display, in a remote assistance user interface, one or more user interface elements indicative of the subset of remote assistance actions. For example, the means can be configured to customize a remote assistance user interface that includes one or more remote assistance toolboxes. A toolbox generation unit 918 is one example of a means for displaying, in a remote assistance user interface, one or more user interface elements indicative of the subset of remote assistance actions.

The means can be configured to determine one or more remote assistance actions from the subset of remote assistance actions based at least in part on a user input associated with the one or more user interface elements and transmit to the autonomous vehicle, one or more control signals associated with the one or more remote assistance actions. For example, an operator can click on (or otherwise select) a remote assistance action. The remote assistance system can then transmit control signals to the associated autonomous vehicle to cause the remote assistance action to be performed. An action execution unit 920 is one example of a means for determining one or more remote assistance actions from the subset of remote assistance actions based at least in part on a user input associated with the one or more user interface elements and transmitting to the autonomous vehicle, one or more control signals associated with the one or more remote assistance actions.

Figure 10:
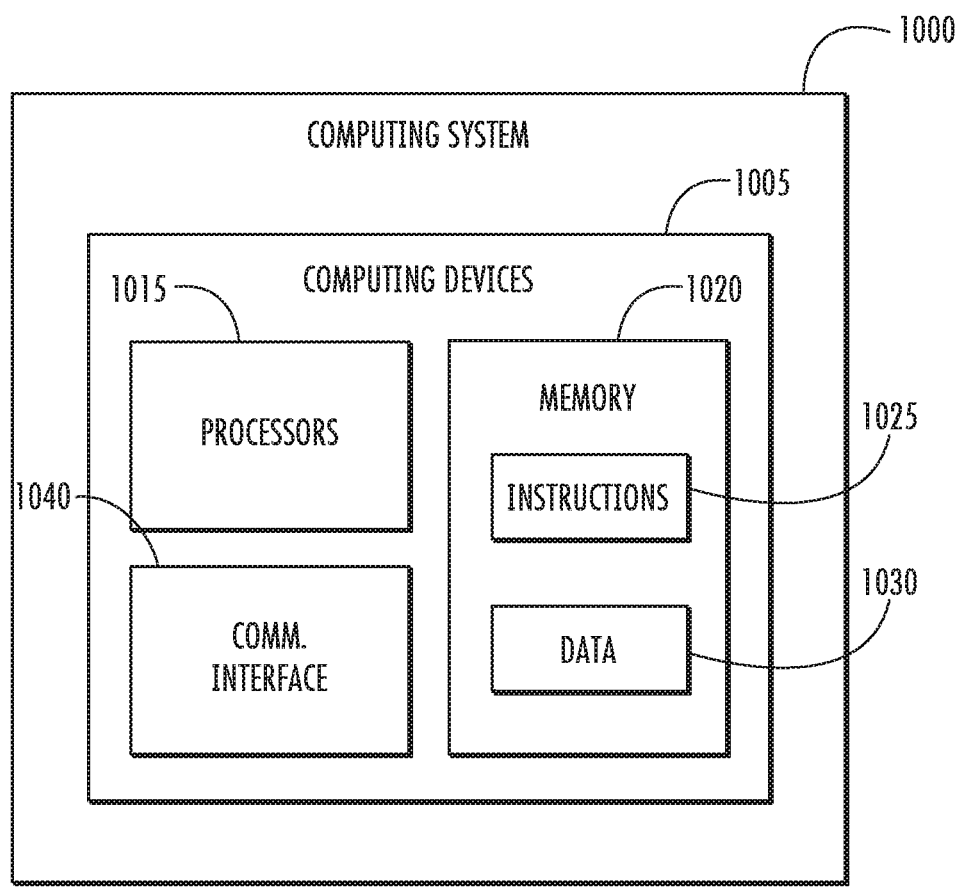
FIG. 10 depicts example system components according to example aspects of the present disclosure.

FIG. 10 depicts a block diagram of an example computing system 1000 according to example embodiments of the present disclosure. The example system 1000 illustrated in FIG. 10 is provided as an example only. The components, systems, connections, and/or other aspects illustrated in FIG. 10 are optional and are provided as examples of what is possible, but not required, to implement the present disclosure. The computing system 1000 can be and/or include the vehicle computing system 100 of FIG. 1. The computing system 1000 can be associated with a central operations system and/or an entity associated with the vehicle 105 such as, for example, a vehicle owner, vehicle manager, fleet operator, service provider, etc.

The computing device(s) 1005 of the computing system 1000 can include processor(s) 1015 and at least one memory 1020. The one or more processors 1015 can be any suitable processing device (e.g., a processor core, a microprocessor, an ASIC, an FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, magnetic disks, data registers, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 806 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015

For example, the memory 1020 on-board the vehicle 105 can store instructions 1025 that when executed by the one or more processors 1015 cause the one or more processors 1015 (e.g., in the vehicle computing system 100) to perform operations such as any of the operations and functions of the computing device(s) 1005 and/or vehicle computing system 100, any of the operations and functions for which the vehicle computing system 100 is configured, and/or any other operations and functions described herein.

The memory 1020 can store data 1030 that can be obtained (e.g., received, accessed, written, manipulated, created, generated, etc.) and/or stored. The data 1030 can include, for instance, services data (e.g., trip data, route data, user data, etc.), sensor data, map data, perception data, prediction data, motion planning data, object states and/or state data, object motion trajectories, feedback data, fault data, log data, and/or other data/information as described herein. In some implementations, the computing device(s) 1005 can obtain data from one or more memories that are remote from the autonomous vehicle 105.

The computing device(s) 1005 can also include a communication interface 1040 used to communicate with one or more other system(s) (e.g., the remote computing system). The communication interface 1040 can include any circuits, components, software, etc. for communicating via one or more networks (e.g., network(s)). In some implementations, the communication interface 1040 can include, for example, one or more of a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:

receiving, by a computing system comprising one or more computing devices, a request for remote assistance from a particular autonomous vehicle;

accessing, by the computing system in response to the request for remote assistance, a local storage location that includes vehicle data for a plurality of autonomous vehicles associated with a plurality of vendors, the vehicle data for the plurality of autonomous vehicles comprising one or more vehicle capabilities of the respective autonomous vehicles, the one or more vehicle capabilities indicating one or more autonomous computing tasks that the respective autonomous vehicles are configured to perform, wherein the autonomous computing tasks comprises at least one of object classification, object prediction, mapping, motion planning, vehicle motion actions, or vehicle status checks;

determining, by the computing system from the local storage location and based at least in part on the request for remote assistance, vehicle data associated with the particular autonomous vehicle, wherein the vehicle data associated with the particular autonomous vehicle comprises one or more vehicle capabilities of the particular autonomous vehicle, the one or more vehicle capabilities indicating one or more autonomous computing tasks that the particular autonomous vehicle is configured to perform;

selecting, by the computing system and based at least in part on the vehicle data, a subset of remote assistance actions from a predetermined set of remote assistance actions based at least in part on the one or more vehicle capabilities of the particular autonomous vehicle;

displaying, by the computing system in a remote assistance user interface, one or more user interface elements indicative of the subset of remote assistance actions;

determining, by the computing system, one or more remote assistance actions from the subset of remote assistance actions based at least in part on a user input associated with the one or more user interface elements; and transmitting, by the computing system, to the particular autonomous vehicle, one or more control signals associated with the one or more remote assistance actions.

2. The computer-implemented method of claim 1, wherein:

determining, by the computing system, the vehicle data comprises accessing at least one item of vehicle data from a local storage location based on the request for remote assistance.

3. The computer-implemented method of claim 1, further comprising:

determining, by the computing system from the local storage location and based at least in part on the request for remote assistance, a fleet operator associated with the particular autonomous vehicle; and determining, by the computing system, the subset of remote assistance actions based at least in part on the fleet operator.

4. The computer-implemented method of claim 3, wherein determining, by the computing system, the subset of remote assistance actions based at least in part on the fleet operator comprises:

determining a first subset of remote assistance actions in response to determining that a first fleet operator is associated with the particular autonomous vehicle or determining a second subset of remote assistance actions in response to determine that a second fleet operator is associated with the particular autonomous vehicle.

5. The computer-implemented method of claim 4, wherein the first subset of remote assistance actions is associated with a first level of remote autonomous control of the particular autonomous vehicle and the second subset of remote assistance actions is associated with a second level of remote autonomous control of the particular autonomous vehicle.

6. The computer-implemented method of claim 4, wherein transmitting, by the computing system, to the particular autonomous vehicle, one or more control signals associated with the selected subset of remote assistance actions further comprises:

in accordance with a determination that the particular autonomous vehicle is associated with the first fleet operator, transmitting the one or more control signals to the particular autonomous vehicle; or in accordance with a determination that the particular autonomous vehicle is associated with the second fleet operator, transmitting the one or more control signals to a server associated with the second fleet operator of the particular autonomous vehicle.

7. The computer-implemented method of claim 1, wherein selecting, by the one or more computing devices and based at least in part on the vehicle data, the subset of remote assistance actions from the predetermined set of remote assistance actions, further comprises:

obtaining data associated with past requests for remote assistance, the past requests including one or more request parameters and one or more associated remote assistance actions;

identifying an association between one or more previous requests for remote assistance and the request for remote assistance based on a correspondence between the vehicle data associated with the one or more previous requests for remote assistance and the vehicle data associated with the particular autonomous vehicle; and selecting the one or more remote assistance actions based at least in part on the one or more previous requests for remote assistance.

8. The computer-implemented method of claim 1, wherein the vehicle data comprises data indicative of at least one of an identification of the particular autonomous vehicle, a type of the particular autonomous vehicle, a vendor of the particular autonomous vehicle, or one or more vehicle capabilities of the particular autonomous vehicle.

9. The computer-implemented method of claim 8, wherein a first assistance type is associated with a first subset of remote assistance actions and a second assistance type is associated with a second subset of remote assistance actions.

10. The computer-implemented method of claim 9, wherein:

the first assistance type is associated with a request for assistance with object classification; and the first subset of remote assistance actions includes remote assistance actions associated with object classification.

11. The computer-implemented method of claim 10, wherein the subset of remote assistance actions associated with object classification includes a list of potential object classifications.

12. The computer-implemented method of claim 10, further comprising:

displaying image data received from the particular autonomous vehicle, wherein the image data is displayed in response to selecting the subset of remote assistance actions.

13. The computer-implemented method of claim 9, wherein:

the first assistance type is associated with a request for assistance with obstacle navigation; and the first subset of remote assistance actions includes remote assistance actions associated with autonomous vehicle pathing.

14. The computer-implemented method of claim 13, wherein the remote assistance actions associated with autonomous vehicle pathing include a path designation action.

15. The computer-implemented method of claim 1, wherein:

vehicle data comprises data indicative of a request for path assistance associated with a motion plan at a first geographic area; and the request for path assistance is associated with at least one remote assistance action of the subset of remote assistance actions.

16. The computer-implemented method of claim 15, wherein the subset of remote assistance actions associated with the request for path assistance includes rerouting the particular autonomous vehicle from a current path to an alternate path.

17. The computer-implemented method of claim 15, wherein the subset of remote assistance actions associated with the request for path assistance includes generating a target vehicle path for the particular autonomous vehicle.

18. A device comprising:
a processor;
a display; and
a memory that stores instructions that, when executed by the processor, cause the device to perform operations, the operations comprising:
receiving a request for remote assistance from a particular autonomous vehicle;
accessing, a local storage location that includes vehicle data for a plurality of autonomous vehicles associated with a plurality of vendors, the vehicle data for the plurality of autonomous vehicles comprising one or more vehicle capabilities of the respective autonomous vehicles, the one or more vehicle capabilities indicating one or more autonomous computing tasks that the respective autonomous vehicles are configured to perform, wherein the autonomous computing tasks comprises at least one of object classification, object prediction, mapping, motion planning, vehicle motion actions, or vehicle status checks;
determining from the local storage location and based at least in part on the request for remote assistance, vehicle data associated with the particular autonomous vehicle, wherein the vehicle data associated with the particular autonomous vehicle comprises one or more vehicle capabilities of the particular autonomous vehicle, the one or more vehicle capabilities indicating one or more autonomous computing tasks that the particular autonomous vehicle is configured to perform;
selecting, based at least in part on the vehicle data, a subset of remote assistance actions from a predetermined set of remote assistance actions based at least in part on the one or more vehicle capabilities of the particular autonomous vehicle;
displaying, in a remote assistance user interface, one or more user interface elements indicative of the subset of remote assistance actions;
determining one or more remote assistance actions from the subset of remote assistance actions based at least in part on a user input associated with the one or more user interface elements; and
transmitting to the particular autonomous vehicle, one or more control signals associated with the one or more remote assistance actions.

19. A non-transitory computer-readable medium storing instructions that, when executed by one or more computing devices, cause the one or more computing devices to perform operations, the operations comprising:
accessing, a local storage location that includes vehicle data for a plurality of autonomous vehicles associated with a plurality of vendors, the vehicle data for the plurality of autonomous vehicles comprising one or more vehicle capabilities of the respective autonomous vehicles, the one or more vehicle capabilities indicating one or more autonomous computing tasks that the respective autonomous vehicles are configured to perform, wherein the autonomous computing tasks comprises at least one of object classification, object prediction, mapping, motion planning, vehicle motion actions, or vehicle status checks;
determining, from the local storage location and based at least in part on a request for remote assistance, vehicle data associated with a particular autonomous vehicle, wherein the vehicle data associated with the particular autonomous vehicle comprises one or more vehicle capabilities of the particular autonomous vehicle, the one or more vehicle capabilities indicating one or more autonomous computing tasks that the particular autonomous vehicle is configured to perform;
selecting, based at least in part on the vehicle data, a subset of remote assistance actions from a predetermined set of remote assistance actions based at least in part on the one or more vehicle capabilities of the particular autonomous vehicle;
displaying, in a remote assistance user interface, one or more user interface elements indicative of the subset of remote assistance actions;
determining one or more remote assistance actions from the subset of remote assistance actions based at least in part on a user input associated with the one or more user interface elements; and
transmitting to the particular autonomous vehicle, one or more control signals associated with the one or more remote assistance actions.

* * * * *

UNITED STATES PATENT AND TRADEMARK OFFICE
CERTIFICATE OF CORRECTION

| | |
|---|---|
| PATENT NO. | : 11,314,246 B2 |
| APPLICATION NO. | : 16/711799 |
| DATED | : April 26, 2022 |
| INVENTOR(S) | : Ghorbanian-Matloob et al. |

It is certified that error appears in the above-identified patent and that said Letters Patent is hereby corrected as shown below:

On the Title Page

Page 2, Column 2, item [56], Lines 1-2, delete "An Autonomous Vehicle Autonomous Vehicle" and insert --Autonomous Vehicle-- therefor Signed and Sealed this
Fourteenth Day of February, 2023

Katherine Kelly Vidal
*Director of the United States Patent and Trademark Office*